US012809741B2

(12) United States Patent
Rosen et al.

(10) Patent No.: US 12,809,741 B2
(45) Date of Patent: Nov. 24, 2026

(54) REDUCING SELECTION OF RESOURCE CONFIGURATIONS

(71) Applicant: MELLANOX TECHNOLOGIES, LTD., Yokneam (IL)

(72) Inventors: Amir Rosen, Haifa (IL); Shie Mannor, Haifa (IL); Sagi Lahav, Kiryat Bialik (IL); Gil Levy, Hod Hasharon (IL); Ariel Szapiro, Kfar Netter (IL)

(73) Assignee: Mellanox Technologies, Ltd, Yokneam (IL)

( * ) Notice: Subject to any disclaimer, the term of this patent is extended or adjusted under 35 U.S.C. 154(b) by 339 days.

(21) Appl. No.: 18/527,296

(22) Filed: Dec. 3, 2023

(65) Prior Publication Data

US 2025/0181474 A1 Jun. 5, 2025

(51) Int. Cl.
*G06F 11/34* (2006.01)

(52) U.S. Cl.
CPC ...... *G06F 11/3428* (2013.01); *G06F 11/3452* (2013.01)

(58) Field of Classification Search
CPC .......................... G06F 11/3428; G06F 11/3452
See application file for complete search history.

(56) References Cited

U.S. PATENT DOCUMENTS

| | | | | |
|---|---|---|---|---|
| 10,402,733 | B1 | 9/2019 | Li et al. | |
| 11,804,050 | B1 | 10/2023 | Milletari et al. | |
| 12,222,875 | B1 | 2/2025 | Huberty et al. | |
| 12,450,171 | B2 * | 10/2025 | Rosen | G06F 12/0862 |
| 12,450,172 | B2 * | 10/2025 | Rosen | G06F 12/0862 |
| 12,499,048 | B2 * | 12/2025 | Mannor | G06F 12/0862 |
| 12,579,070 | B2 * | 3/2026 | Rosen | G06F 12/0862 |
| 2014/0304477 | A1 | 10/2014 | Hughes et al. | |
| 2016/0283970 | A1 | 9/2016 | Ghavamzadeh et al. | |

(Continued)

FOREIGN PATENT DOCUMENTS

| | | | |
|---|---|---|---|
| WO | 2017189033 | A1 | 11/2017 |
| WO | 2023088535 | A1 | 5/2023 |

OTHER PUBLICATIONS

Rahman et al., "Maximizing Hardware Prefetch Effectiveness with Machine Learning," Proceedings of the ACM/IEEE Conference on High Performance Computing and Communications, pp. 1-7, year 2015.

(Continued)

*Primary Examiner* — Walter L Lindsay, Jr.
*Assistant Examiner* — Geoffrey T Evans
(74) *Attorney, Agent, or Firm* — Meitar Patents LTD.; Daniel Kligler

(57) ABSTRACT

In one embodiment, a method includes finding an impact on performance of a device from changing settings of preprocessor engines applied to benchmark applications being executed by the device, defining groups of the preprocessor engines responsively to the impact on the performance of the device from changing the settings of the preprocessor engines, and providing different preprocessor engine configurations based on the settings to be applied to the preprocessor engines such that for each one of the defined groups a respective setting is to be applied equally to the preprocessor engines of the one group, thereby reducing a number of the preprocessor engine configurations available for selection by a machine learning agent.

29 Claims, 15 Drawing Sheets

(56) References Cited

U.S. PATENT DOCUMENTS

| | | | |
|---|---|---|---|
| 2021/0089472 | A1 | 3/2021 | Ishii et al. |
| 2021/0374523 | A1 | 12/2021 | Gottin et al. |
| 2022/0004897 | A1 | 1/2022 | Jadon et al. |
| 2022/0197856 | A1 | 6/2022 | Khasawneh et al. |
| 2022/0318017 | A1 | 10/2022 | Garg et al. |
| 2022/0374367 | A1 | 11/2022 | Fang et al. |
| 2023/0236977 | A1 | 7/2023 | Dev et al. |
| 2023/0391374 | A1 | 12/2023 | Chen et al. |
| 2025/0139439 | A1 | 5/2025 | Abts |
| 2025/0181411 | A1* | 6/2025 | Rosen ...................... G06N 5/01 |
| 2025/0181968 | A1* | 6/2025 | Szapiro .................. G06N 20/00 |

OTHER PUBLICATIONS

Liao et al., "Machine Learning-Based Prefetch Optimization for Data Center Applications," Conference Paper, SC 09, pp. 1-11, Nov. 2009.

Eris et al., "Puppeteer: A Random Forest Based Manager for Hardware Prefetchers Across the Memory Hierarchy," ACM Transactions on Architecture and Code Optimization, vol. 20, No. 1, Article 19, pp. 1-25, Dec. 2022.

Wikipedia, "Greedy Algorithm," pp. 1-6, Aug. 14, 2023.

Gerogiannis et al., "Micro-Armed Bandit: Lightweight & Reusable Reinforcement Learning for Microarchitecture Decision-Making," Conference Paper, MICRO '23, pp. 1-16, Nov. 2023.

Mannor et al., U.S. Appl. No. 18/527,293, filed Dec. 3, 2023.

Szapiro et al., U.S. Appl. No. 18/527,294, filed Dec. 3, 2023.

Rosen et al., U.S. Appl. No. 18/527,295, filed Dec. 3, 2023.

Rosen et al., U.S. Appl. No. 18/527,297, filed Dec. 3, 2023.

US Non Final Office Action U.S. Appl. No. 18/527,293, dated Apr. 10, 2025.

US Non Final Office Action U.S. Appl. No. 18/623,103, dated May 13, 2025.

US Non Final Office Action U.S. Appl. No. 18/623,099, dated Apr. 4, 2025.

Chou Y., "Low-Cost Epoch-Based Correlation Prefetching for Commercial Applications," 40th Annual IEEE/ACM International Symposium on Microarchitecture (MICRO2007), 2007, pp. 301-313.

Herzog B., et al., "Bears: Building Energy-Aware Reconfigurable Systems," 2022 XII Brazilian Symposium on Computing Systems Engineering (SBESC), Fortaleza/CE, Brazil, 2022, 8 paages.

Non-Final Office Action for U.S. Appl. No. 18/527,294, dated Aug. 26, 2026, 17 Pages.

* cited by examiner

TABLE OF (COSINE) SIMILARITY

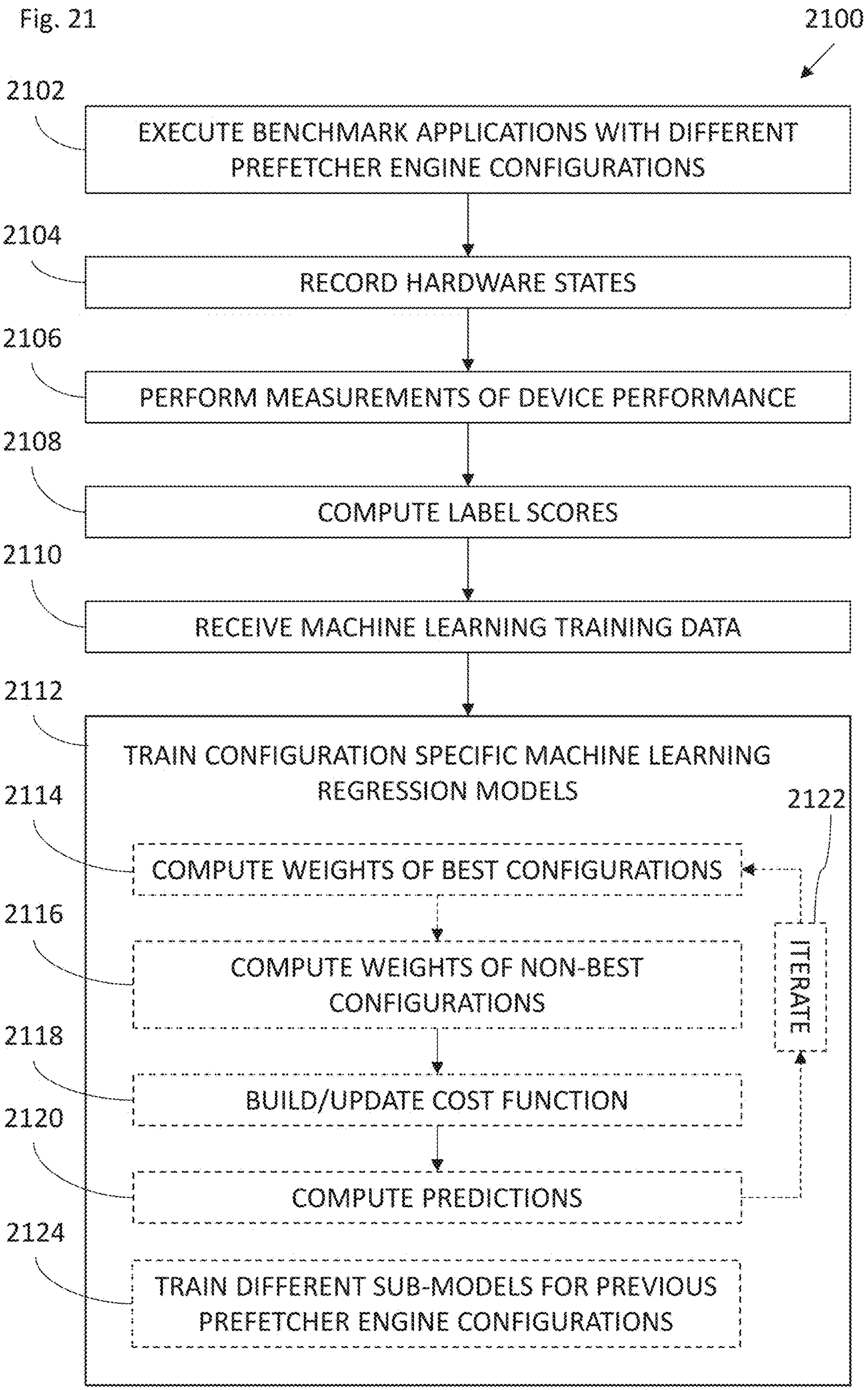
Fig. 21
2100
2102
EXECUTE BENCHMARK APPLICATIONS WITH DIFFERENT PREFETCHER ENGINE CONFIGURATIONS
2104
RECORD HARDWARE STATES
2106
PERFORM MEASUREMENTS OF DEVICE PERFORMANCE
2108
COMPUTE LABEL SCORES
2110
RECEIVE MACHINE LEARNING TRAINING DATA
2112
TRAIN CONFIGURATION SPECIFIC MACHINE LEARNING REGRESSION MODELS
2114
COMPUTE WEIGHTS OF BEST CONFIGURATIONS
2122
ITERATE
2116
COMPUTE WEIGHTS OF NON-BEST CONFIGURATIONS
2118
BUILD/UPDATE COST FUNCTION
2120
COMPUTE PREDICTIONS
2124
TRAIN DIFFERENT SUB-MODELS FOR PREVIOUS PREFETCHER ENGINE CONFIGURATIONS

REDUCING SELECTION OF RESOURCE CONFIGURATIONS

FIELD OF THE INVENTION

The present invention relates to computer systems, and in particular, but not exclusively to, reducing resource configurations.

BACKGROUND

Prefetchers aim to improve memory access performance. They predict which data or instructions will be needed in the near future and proactively fetch them from slower memory (such as RAM) into faster cache memory. By doing so, they reduce the latency associated with fetching data on demand. Prefetching can be done either by hardware (dedicated mechanisms within the processor) or by software (compiler-generated instructions).

Prefetcher aggressiveness refers to the level of intensity with which a prefetcher operates in a computer system and may be indicated by a ratio of the number of cache lines loaded to the number of cache lines used. In multi-core systems (such as chip multiprocessors), prefetch requests from one core can interfere with the demands and prefetch requests of other cores. Aggressive prefetching can lead to excessive inter-core interference, negatively impacting overall system performance. Even in a single core environment aggressive prefetcher may lead to problems such as high-power consumption. Prefetcher aggressiveness controllers play a crucial role in minimizing this interference and reducing power consumption.

Researchers have proposed various control schemes to manage prefetcher aggressiveness. Global Prefetcher Aggressiveness Control Scheme (GPACS) is a scheme that adjusts the aggressiveness of multiple hardware prefetchers across different cores using a global control mechanism. It considers both shared last-level cache and memory queue prefetch-caused inter-core interference. Other techniques involve coordinated control of multiple prefetchers and feedback-directed prefetching. The challenge lies in finding the right balance. Too aggressive prefetching can cause unnecessary cache pollution and resource contention as CPU resources are also used for prefetched data which is not used. Too conservative prefetching may underutilize available resources and result in suboptimal performance. In summary, prefetcher aggressiveness is about striking the right balance between proactive data fetching and minimizing interference.

SUMMARY

There is provided in accordance with an embodiment of the present disclosure, a method, including finding an impact on performance of a device from changing settings of preprocessor engines applied to benchmark applications being executed by the device, defining groups of the preprocessor engines responsively to the impact on the performance of the device from changing the settings of the preprocessor engines, and providing different preprocessor engine configurations based on the settings to be applied to the preprocessor engines such that for each one of the defined groups a respective setting is to be applied equally to the preprocessor engines of the one group, thereby reducing a number of the preprocessor engine configurations available for selection by a machine learning agent.

Further in accordance with an embodiment of the present disclosure the preprocessor engines are prefetcher engines, the settings are aggressiveness levels, and the preprocessor engine configurations are prefetcher engine configurations.

Still further in accordance with an embodiment of the present disclosure, the method includes executing the benchmark applications while changing the settings of the preprocessor engines, and measuring the performance of the device during the execution of the benchmark applications, wherein the finding includes finding the impact on performance based on the measured performance of the device.

Additionally in accordance with an embodiment of the present disclosure a number of the preprocessor engines is equal to X, a number of the settings is equal to Y, a number of the defined groups is equal to Z, and the number of the preprocessor engine configurations is reduced from $Y^X$ to $Y^Z$.

Moreover, in accordance with an embodiment of the present disclosure, the method includes computing statistical measures based on vectors for corresponding ones of the prefetchers engines describing the impact on the performance of the device of changing settings of the preprocessor engines applied to benchmark applications being executed by the device, wherein the defining includes defining the groups based on the computed statistical measures.

Further in accordance with an embodiment of the present disclosure the computing includes computing a measure of dispersion for each of the vectors, and computing measures of similarity between pairs of the vectors, and the defining includes defining the groups based on the computed measure of dispersion of at least some of the vectors and the computed measures of similarity between at least some of the pairs of vectors.

Still further in accordance with an embodiment of the present disclosure the measure of dispersion is a variance or a standard deviation.

Additionally in accordance with an embodiment of the present disclosure each of the measures of similarity is a cosine similarity or correlation.

Moreover, in accordance with an embodiment of the present disclosure, the method includes selecting pivotal members of the groups such that a different one of the preprocessor engines is selected as a pivotal member of each of the groups based on the measure of dispersion of corresponding ones of the vectors.

Further in accordance with an embodiment of the present disclosure the selecting includes selecting the pivotal members based on highest measures of deviation of corresponding ones of the vectors.

Still further in accordance with an embodiment of the present disclosure the selecting includes selecting the pivotal members based on the measure of dispersion of corresponding ones of the vectors while minimizing the measures of similarity between the corresponding ones of the vectors of the pivotal members.

Additionally in accordance with an embodiment of the present disclosure, the method includes, for each one of the groups, adding other ones of the preprocessor engines to the one group based on the measures of similarity of ones of the vectors with the vector of the pivotal member of the one group.

Moreover, in accordance with an embodiment of the present disclosure, the method includes, for each one of the groups, adding at least one of the preprocessor engines to the one group based on at least one of the measures of similarity of at least one of the vectors with at least one of the vectors of at least one existing member of the one group.

There is also provided in accordance with another embodiment of the present disclosure, a system, including a processor to find an impact on performance of a device from changing settings of preprocessor engines applied to benchmark applications being executed by the device, define groups of the preprocessor engines responsively to the impact on the performance of the device from changing the settings of the preprocessor engines, and provide different preprocessor engine configurations based on the settings to be applied to the preprocessor engines such that for each one of the defined groups a respective setting is to be applied equally to the preprocessor engines of the one group, thereby reducing a number of the preprocessor engine configurations available for selection by a machine learning agent, and a memory to store data used by the processor.

Further in accordance with an embodiment of the present disclosure the preprocessor engines are prefetcher engines, the settings are aggressiveness levels, and the preprocessor engine configurations are prefetcher engine configurations.

Still further in accordance with an embodiment of the present disclosure, the system includes the preprocessor engines, wherein the processor is to execute the benchmark applications while changing the settings of the preprocessor engines, measure the performance of the device during the execution of the benchmark applications, and find the impact on performance based on the measured performance of the device.

Additionally in accordance with an embodiment of the present disclosure a number of the preprocessor engines is equal to X, a number of the settings is equal to Y, a number of the defined groups is equal to Z, and the number of the preprocessor engine configurations is reduced from $Y^X$ to $Y^Z$.

Moreover, in accordance with an embodiment of the present disclosure the processor is to compute statistical measures based on vectors for corresponding ones of the prefetchers engines describing the impact on the performance of the device of changing settings of the preprocessor engines applied to benchmark applications being executed by the device, and define the groups based on the computed statistical measures.

Further in accordance with an embodiment of the present disclosure the processor is to compute a measure of dispersion for each of the vectors, and compute measures of similarity between pairs of the vectors, and define the groups based on the computed measure of dispersion of at least some of the vectors and the computed measures of similarity between at least some of the pairs of vectors.

Still further in accordance with an embodiment of the present disclosure the measure of dispersion is a variance or a standard deviation.

Additionally in accordance with an embodiment of the present disclosure each of the measures of similarity is a cosine similarity or correlation.

Moreover, in accordance with an embodiment of the present disclosure the processor is to select pivotal members of the groups such that a different one of the preprocessor engines is selected as a pivotal member of each of the groups based on the measure of dispersion of corresponding ones of the vectors.

Further in accordance with an embodiment of the present disclosure the processor is to select the pivotal members based on highest measures of deviation of corresponding ones of the vectors.

Still further in accordance with an embodiment of the present disclosure the processor is to select the pivotal members based on the measure of dispersion of corresponding ones of the vectors while minimizing the measures of similarity between the corresponding ones of the vectors of the pivotal members.

Additionally in accordance with an embodiment of the present disclosure the processor is to, for each one of the groups, add other ones of the preprocessor engines to the one group based on the measures of similarity of ones of the vectors with the vector of the pivotal member of the one group.

Moreover, in accordance with an embodiment of the present disclosure the processor is to, for each one of the groups, add at least one of the preprocessor engines to the one group based on at least one of the measures of similarity of at least one of the vectors with at least one of the vectors of at least one existing member of the one group.

There is also provided in accordance with still another embodiment of the present disclosure, a system, including preprocessor engines, and a processor to execute a software application, execute a machine learning agent to select from different preprocessor engine configurations to control the preprocessor engines, the different preprocessor engine configurations being based on settings to be applied to the preprocessor engines such that groups of the preprocessor engines are defined and for each one of the defined groups a respective setting is to be applied equally to the preprocessor engines of the one group, and control the preprocessor engines the different preprocessor engine configurations selected by the machine learning agent during execution of the software application.

Further in accordance with an embodiment of the present disclosure the settings are aggressiveness levels, the preprocessor engine configurations are prefetcher engine configurations, and the preprocessor engines are prefetcher engines to predict next memory access addresses of a memory from which to load data to a cache during execution of the software application, and load the data from the predicted next memory access addresses to the cache during execution of the software application.

There is also provided in accordance with still another embodiment of the present disclosure a method, including executing a software application, executing a machine learning agent to select from different preprocessor engine configurations to control preprocessor engines, the different preprocessor engine configurations being based on settings to be applied to the preprocessor engines such that groups of the preprocessor engines are defined and for each one of the defined groups a respective setting is to be applied equally to the preprocessor engines of the one group, and controlling the preprocessor engines the different preprocessor engine configurations selected by the machine learning agent during execution of the software application.

BRIEF DESCRIPTION OF THE DRAWINGS

The present invention will be understood from the following detailed description, taken in conjunction with the drawings in which:

FIG. 21 is a flowchart including steps in a method for training regression models for use in the device of FIG. 1;

DESCRIPTION OF EXAMPLE EMBODIMENTS

Overview

Figure 1:
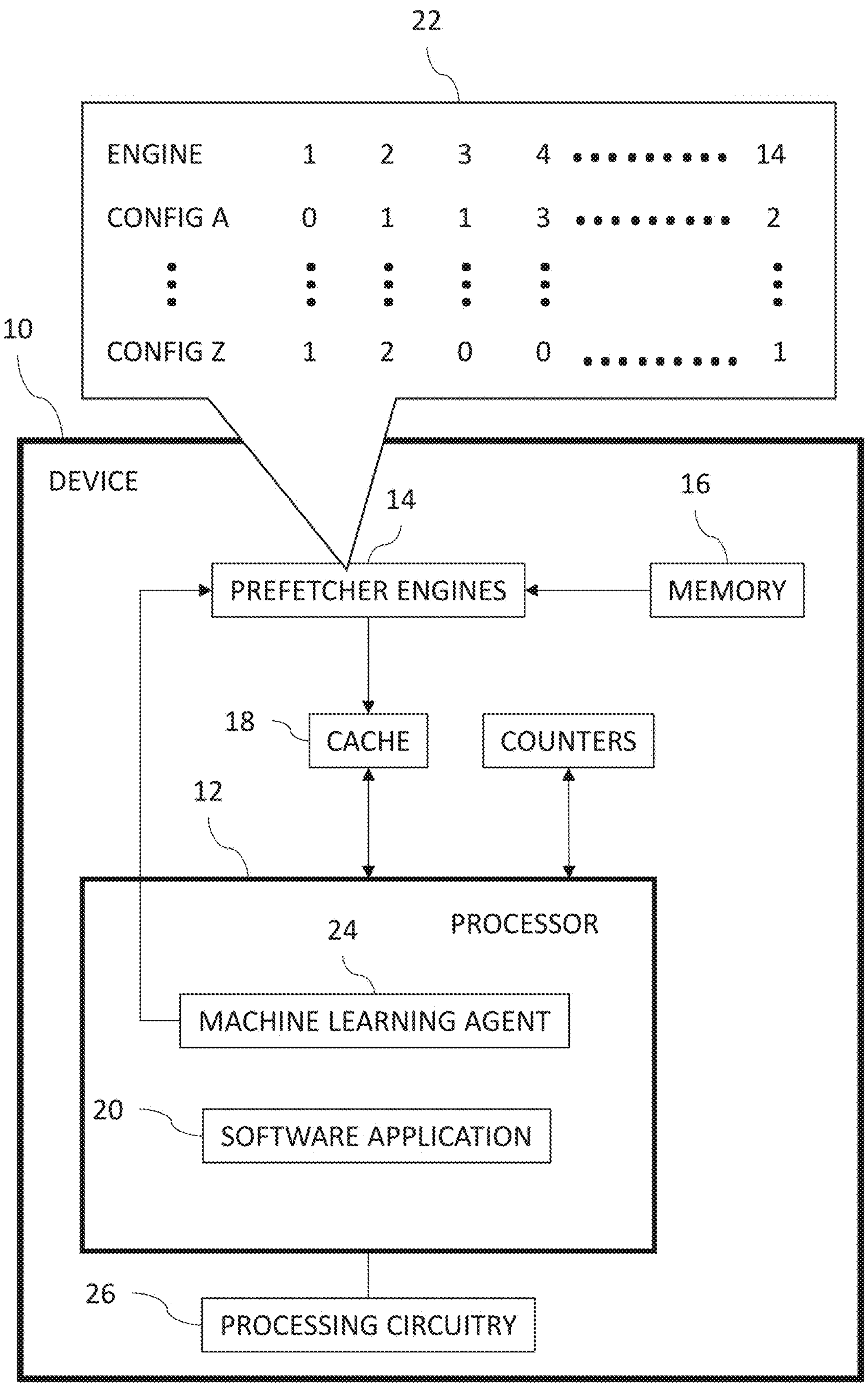
FIG. 1 is a block diagram view of a device constructed and operative in accordance with an embodiment of the present invention.

Modern CPU architectures have provided many enhancements to prefetcher heuristics. More tailor-made prefetcher engines have been added to identify different memory access patterns (e.g., fixed offset, streams, linked lists etc.). Therefore, the aggressiveness level of each of the prefetchers should be carefully selected in order to find the right balance between proactive data fetching and minimizing interference, and minimizing power consumption.

The term "aggressiveness" or "aggressiveness level" may provide a measure of how many cache lines are loaded into the cache(s) by a prefetcher engine and how many of the loaded cache lines are used by the CPU or processor—the less cache lines used, the more aggressive is the setting of the prefetcher engine.

By way of example, a NVIDIA® CPU includes 14 different prefetcher engines providing prefetcher functions to different caching levels. Each of the different prefetcher engines has four different aggressiveness levels which may include a level of zero aggressiveness associated with no prefetching. Therefore, there would be $4^{14}$ (i.e., 268,435,456) different configurations of the prefetcher engines based on each of the prefetcher engines being controlled independently according to any one of the four different aggressiveness levels.

Selecting the correct prefetcher engines (and their associated aggressiveness) for a given workload has the potential to mitigate the prefetcher built-in disadvantages and maximum system performance. Therefore, selecting the best configuration of prefetchers (including the aggressiveness of each prefetcher) for a given workload is important. However, as the number of prefetcher configurations is very large and different workloads behave differently, the task is challenging.

Therefore, embodiments of the present invention, address at least some of the abovementioned drawbacks, by providing a system which selects from a set of prefetcher configurations to find configurations which aim to maximum system performance using a machine learning agent. The machine learning agent predicts which prefetcher engines and with which aggressiveness levels (i.e., which prefetcher engine configuration) should be selected for each workload being processed by each processing unit (e.g., each core or thread) in order to try to maximize system performance.

In some embodiments, supervised learning is used to select prefetcher configurations (e.g., using multiple regression models for corresponding prefetcher engine configurations), as described in disclosed embodiments.

In some embodiments, machine learning training data is used to train configuration specific machine learning regression models to provide configuration specific device performance predictions based on given device hardware states. For example, a regression model is trained for prefetcher configuration A to provide a device performance prediction (i.e., predict how the device will behave) if the prefetcher engines are set according to configuration A based on a given hardware state (e.g., represented by counter values), a regression model is trained for prefetcher configuration B to provide a device performance prediction (i.e., predict how the device will behave) if the prefetcher engines are set according to configuration B based on a given hardware state (e.g., represented by counter values), and so on for other configurations. In some embodiments, each regression module is also trained to provide a prediction based on the given hardware state and the configuration used to control the prefetcher engines in the previous processing interval. The device performance prediction may be an indication of executed instruction per cycle (IPC) or any suitable metric or any combination of suitable metrics. The hardware state may be indicated by central processing unit (CPU) statistical counters such as performance counters available in ARM cores.

In use, prior to each processing interval, the hardware state is retrieved, and the retrieved hardware state (and optionally the previous configuration used to control the prefetcher engines) is input into each of the trained regression models yielding a prediction for each trained regression model. For example, the retrieved hardware state is input into the trained regression model for prefetcher engine configuration A, which provides a prediction, the same retrieved hardware state is input into the trained regression model for prefetcher engine configuration B, which provides a prediction, and so on. The regression model yielding the best (e.g., the highest or lowest value depending on whether the performance indicator is maximized or minimized, respectively) prediction indicates the prefetcher engine configuration that is used in the next processing interval to control the prefetcher engines. In this manner, the hardware state (and optionally the configuration used to control the prefetcher engines) of the previous processing interval is used to find the prefetcher engine configuration to use in the next processing interval.

The training data may be obtained by running benchmark applications with different prefetcher engine configurations, for example, running each benchmark application with each prefetcher engine configuration and perform measurements of device performance (e.g., IPC, memory transactions per cycle, power cost per memory transaction, average core frequency, average core power, and temperature) and capture hardware states (e.g., counter values) for each processing interval. The measurements of device performance may be used to compute a score or label, as described in disclosed embodiments. The regression models are trained to map the captured hardware states to labels (e.g., scores or measurements of device performance).

In some embodiments, the configuration specific machine learning regression models are trained using configuration specific cost functions based on data indicative of different scenarios while running the benchmark applications. In some embodiments, the data of the different scenarios is weighted in the cost functions according to a deemed significance of the different scenarios, as described in disclosed embodiments.

In some embodiments, as an alternative to having a single regression model per configuration, each configuration specific machine learning regression model includes different sub-models for different previous prefetcher engine configurations of the previous time window. For example, the regression model for configuration A may include a sub-model for configuration A (termed "sub-model A-A"), a sub-model for configuration B (termed sub-model A-B, and so on. Similarly, the regression model for configuration D may include a sub-model for configuration A (termed "sub-model D-A"), a sub-model for configuration B (termed sub-model D-B, and so on. For example, the sub-model D-B is a regression model trained to provide a device performance prediction if the prefetcher engines are to be set according to configuration D based on a given hardware state (e.g., represented by counter values) and the configuration of the previous processing interval is configuration B. Therefore, if there are N configurations, there may be $N^2$ sub-models. In use, the relevant sub-models will be selected and applied to provide predictions. The best prediction indicates the configuration to be used in the next processing interval. For example, if the configuration used in the previous processing interval is configuration G, then sub-model A-G, sub-model B-G, sub-model C-G, and so on, are selected and applied to provide predictions based on the given hardware state of the previous processing interval. If sub-model B-G provides the best prediction, then configuration B is selected to configure the prefetcher engines in the next processing interval.

In some embodiments, reinforcement learning, e.g., a multi-armed bandit, is used to select prefetcher configurations in different exploration and exploitation phases to maximize system performance.

In some embodiments, a processor executes a software application and controls the prefetcher engines according to configurations of prefetcher engines selected by a multi-armed bandit machine learning agent in exploration phases and in exploitation phases during execution of the software application. The multi-armed bandit machine learning agent may determine whether a next phase should be an exploration phase or an exploitation phase according to any suitable scheme, for example, an epsilon greedy scheme.

The multi-armed bandit machine learning agent may select the prefetcher configuration to use during any exploration phase using any suitable scheme. For example, the multi-armed bandit machine learning agent may randomly select the prefetcher configuration to use during any exploration phase. For example, the multi-armed bandit machine learning agent may select the prefetcher configuration to use during any exploration phase based on different probabilities to explore of the different configurations, where the probabilities to explore may be based on prior knowledge gained from controlling benchmark applications according to the prefetcher configurations, as described in disclosed embodiments.

In some embodiments, the processor performs measurements on the system during execution of the multi-armed bandit machine learning agent during each exploitation and/or exploration phase to measure the system performance associated with using each of the prefetcher configurations. The measurements may include any one or more of the following: executed instructions per cycle, memory transactions per cycle, power cost per memory transaction, average core frequency, average core power, and temperature (e.g., core or processor temperature). The processor may then compute a score for each exploitation/exploration phase based on the measurements. The scores for each configuration may be averaged, e.g., an aged average, or otherwise combined, to provide an indication of potential reward from controlling the prefetcher engines according to that configuration.

The processor executes the multi-armed bandit machine learning agent to select from the prefetcher configurations to maximize potential rewards from controlling the prefetcher engines in the exploitation phases based on the computed potential rewards which are based on the computed scores which are based on the measurements of the system.

In both machine learning modes (supervised and reinforcement learning), machine learning is more efficient when the size of the set of prefetcher configurations is limited to a smaller set, e.g., in the range of 10 to 100 configurations. Disclosed embodiments describe how to reduce a larger set of configurations to a smaller set of configurations. The methods of the disclosed embodiments may be used independently or in combination. For example, one method may be used to reduce the size of the set of configurations (e.g., from 268,435,456 configurations to 256 configurations), and another method may be used to further reduce the size of the set of configurations (e.g., from 256 configurations to 10, 20, 50 or 100 configurations).

In some embodiments, the number of configurations is reduced by defining groups of prefetcher engines and stipulating that for each group, the same aggressiveness level is applied to the prefetcher engines of that group. For example, prefetchers in group A are all assigned the same aggressiveness level, the prefetchers in group B are all assigned the same aggressiveness level (which may be the same or different from group A), and so on. As previous mentioned if the system includes 14 prefetcher engines with four different aggressiveness levels to select from, there would be $4^{14}$ (i.e., 268,435,456) different configurations of the prefetcher engines based on each of the prefetcher engines being controlled independently according to any one of the four different aggressiveness levels. However, if the 14 prefetcher engines are assigned among four groups, and the same aggressiveness level is applied to the prefetcher engines of each group, there would now be $4^4$ (i.e., 256) different configurations of the prefetcher engines based on the prefetcher engines being controlled by group (e.g., four groups) according to any one of the four different aggressiveness levels.

The prefetcher engines may be assigned to the groups based on any suitable method. In some embodiments, the prefetcher engines are assigned to the groups based on statistical measures, such as dispersion (e.g., standard deviation) and similarity (e.g., cosine similarity), derived from vectors for corresponding prefetchers engines describing the impact on the performance of the device by changing settings of the prefetcher engines applied to benchmark applications being executed by the device, as described in disclosed embodiments.

In some embodiments, the number of configurations is reduced by defining an order of some of the configurations based on measured device performance while running benchmark application with the different configurations, and providing a pruned set of configurations based on the order of the configurations. For example, if the original configuration set included 256 configurations, the pruned set may include 10 or 20 configurations. The best configuration may be found by finding the configuration that provides the best measured performance, such as best average performance over the benchmark applications. A second-best configuration may be found by finding a configuration which is the second-best configuration based on the best configuration already been found to be the best configuration. The third-best configuration may be found by finding a configuration which is the third-best configuration based on the best and second-based configurations already been found, and so on.

Embodiments of the present invention improve the way a computer or other processing device works by providing better computer performance, providing higher processing speed, providing less latency, higher data access speed, and reduced power consumption, by way of example.

System Description

Reference is now made to FIG. 1, which is a block diagram view of a device 10 constructed and operative in accordance with an embodiment of the present invention. The device 10 includes a processor 12, prefetcher engines 14, a memory 16, and at least one cache 18. The prefetcher engines 14 are configured to predict next memory access addresses of the memory 16 from which to load data to the cache 18 during execution of a software application 20 by the processor 12. The prefetcher engines 14 may operate in different ways to predict next memory access addresses even when all the prefetcher engines 14 are set to the same aggressiveness level. The prefetcher engines 14 are configured to load the data (e.g., cache lines) from the predicted next memory access addresses to the cache 18 during execution of the software application 20.

Each of the prefetcher engines 14 is configured to selectively provide different levels of aggressiveness (e.g., levels 0 to 3). One of the aggressiveness levels (e.g., level 0) of one of the prefetcher engines 14 may indicate that prefetcher engine 14 is turned off, i.e., the prefetcher engine 14 does not predict next memory access addresses and does not load data to the cache. Different configurations of the prefetcher engines 14 provide different aggressiveness configurations of the prefetcher engines 14. The device 10 may be implemented with any suitable number of prefetcher engines 14 which have any suitable number of aggressiveness levels. The example of FIG. 1 assumes that there are fourteen prefetcher engines 14 and each prefetcher engine 14 may be assigned any aggressiveness level selected from four aggressiveness levels. By way of illustration, prefetcher engines 14 may have a configuration A shown in insert 22 where prefetcher engine 1 has an aggressiveness level of 0, prefetcher engine 2 has an aggressiveness level of 1, prefetcher engine 3 has an aggressiveness level of 1, prefetcher engine 4 has an aggressiveness level of 3, and so on. Insert 22 also shows configuration Z where prefetcher engine 1 has an aggressiveness level of 1, prefetcher engine 2 has an aggressiveness level of 2, prefetcher engine 3 has an aggressiveness level of 0, prefetcher engine 4 has an aggressiveness level of 0, and so on.

If each prefetcher engine 14 is allowed to be assigned any aggressiveness level independent of the assigned aggressiveness level of other prefetcher engines 14, then there would be $4^{14}$ (i.e., 268,435,456) possible configurations of the prefetcher engines 14. The number of possible configurations is generally restricted (e.g., reduced) in order to allow more efficient machine learning as described in more detail below. The number of prefetcher engine configurations may be reduced using any suitable method. Two different methods of reducing the number of prefetcher engine configurations are described in disclosed embodiments with reference to FIGS. 4-20.

In practice, some, or all of the functions of the prefetcher engines 14 may be combined in a single physical component or, alternatively, implemented using multiple physical components. These physical components may comprise hard-wired or programmable devices, or a combination of the two. In some embodiments, at least some of the functions of the prefetcher engines 14 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The processor 12 is configured to execute the software application 20. The processor 12 is configured to select one of the prefetcher engine configurations to control the prefetcher engines 14 in each processing interval using a machine learning agent 24, described in more detail below. The processing intervals are described in more detail below with reference to FIG. 2.

The processor 12 is configured to control the prefetcher engines 14 according to configurations of the prefetcher engines 14 selected by the machine learning agent 24 in exploration phases and in exploitation phases during execution of the software application 20. The machine learning agent 24 may determine whether a next phase should be an exploration phase or an exploitation phase according to any suitable scheme, for example, an epsilon greedy scheme. In some embodiments, the machine learning agent 24 is a multi-armed bandit machine learning agent.

The processor 12 is configured to execute the machine learning agent 24 to select from the prefetcher engine configurations (e.g., a pruned set of prefetcher engine configurations) to control the prefetcher engines 14 in the exploration phases. The machine learning agent 24 may select the prefetcher configurations to use during the exploration phases using any suitable scheme. For example, the machine learning agent 24 may randomly select the prefetcher configuration to use during an exploration phase. For example, the multi-armed bandit machine learning agent may select the prefetcher configuration to use during an exploration phase based on different probabilities to explore of the different configurations, where the probabilities to explore may be based on prior knowledge gained from controlling benchmark applications according to the prefetcher configurations, as described in disclosed embodiments, with reference to FIG. 3.

The processor 12 is configured to perform measurements on the system (e.g., on the device 10) during execution of the machine learning agent 24. The performed measurements may include any one or more of the following: executed instructions per cycle; memory transactions per cycle; power cost per memory transaction; average core frequency; average core power; and measured temperature (e.g., of the processor). In some embodiments, the performed measurements may include any two or more of the following: executed instructions per cycle; memory transactions per cycle; power cost per memory transaction; average core frequency; average core power; and measured temperature (e.g., of the processor).

The processor 12 is configured to execute the machine learning agent 24 to select from the configurations (e.g., the pruned set of configurations) to maximize potential rewards from controlling the prefetcher engines 14 (and optionally controlling other system parameters) in the exploitation phases based on the performed measurements. Computing scores based on the performed measurements and maximizing potential rewards are described in more detail with reference to FIG. 2.

In some embodiments, the processor 12 is configured to execute the machine learning agent 24 to select from the configurations to maximize potential rewards (which may be based on performance scores described in more detail with reference to FIG. 2) from controlling the prefetcher engines 14 in the exploitation phases and minimize potential losses of reward from controlling the prefetcher engines 14 in the exploration phases, based on the performed measurements. Minimizing potential losses of reward from controlling the prefetcher engines 14 in the exploration phases may be performed by selecting the prefetcher engine configurations according to a probability to explore, as described in disclosed embodiments, with reference to FIG. 3.

Figure 2:
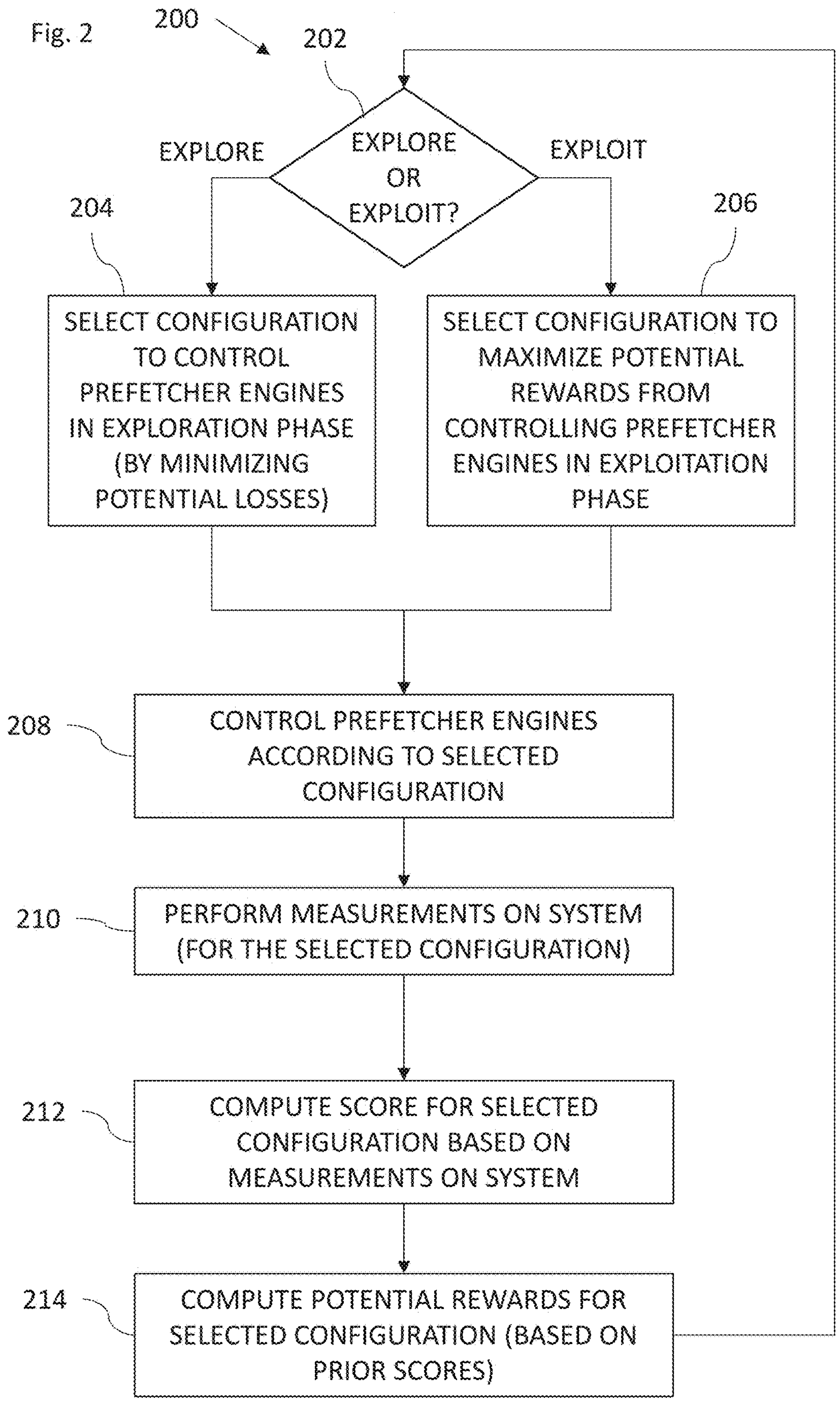
FIG. 2 is a flowchart including steps in a method to select configurations of prefetcher engines in exploration and exploitation phases.

Reference is now made to FIG. 2, is a flowchart 200 including steps in a method to select configurations of prefetcher engines 14 in exploration and exploitation phases. After a previous processing interval, which may have been an exploration or an exploitation phase, the machine learning agent 24 is configured to determine whether a next processing interval should be an exploration or an exploitation phase (decision block 202). The machine learning agent 24 may decide whether the next processing interval should be an exploration or an exploitation phase using any suitable scheme, for example, but not limited to, an epsilon greedy scheme. In some embodiments, the machine learning agent 24 may perform exploration phases and exploitations phases without explicitly determining whether the next phase should be exploration or exploitation, for example, a UCB or Thomson multi-armed bandit.

If the machine learning agent 24 determines that the next processing interval should be an exploration phase, the machine learning agent 24 is configured to select a prefetcher configuration from a set of prefetcher configurations to control the prefetcher engines 14 in the exploration phase of the next processing interval (block 204). The machine learning agent 24 may select the prefetcher configuration to control the prefetcher engines 14 in the exploration phase using any suitable scheme, for example, randomly. In some embodiments, the machine learning agent 24 is configured to select a prefetcher configuration from the set of prefetcher configurations to control the prefetcher engines 14 in the exploration phase of the next processing interval to minimize potential losses, for example, based on probabilities associated with each of the prefetcher configurations, as described in more detail with reference to FIG. 3.

If the machine learning agent 24 determines that the next processing interval should be an exploitation phase, the machine learning agent 24 is configured to select a prefetcher configuration from the set of prefetcher configurations to control the prefetcher engines 14 in the exploitation phase of the next processing interval to maximize potential rewards from controlling the prefetcher engines 14 (and optionally controlling other system parameters) in the exploitation phase (block 206). The machine learning agent 24 is configured to maximum potential rewards by selecting the prefetcher configuration providing maximum potential (e.g., estimated) rewards compared to the potential rewards of other prefetcher configurations. The potential rewards of each prefetcher configuration may be computed based on previous scores of system performance from operating the prefetcher engines 14 according to that prefetcher configuration in previous exploration and optionally exploitation phases, as described in more detail below.

The processor 12 is configured to control the prefetcher engines 14 according to the prefetcher configuration selected in either the step of block 204 or the step of block 206 (block 208) in the next processing interval. The processor 12 is configured to perform measurements on the system (e.g., at the end of the next processing interval, which becomes the previous processing interval) (block 210). The performed measurements may include any one or more of the following: executed instructions per cycle; memory transactions per cycle; power cost per memory transaction; average core frequency; average core power; and measured temperature (e.g., of the processor). The processor 12 is configured to compute a score based on the performed measurements (block 212) and other factors, such as power budget, described in more detail below. Therefore, the score provides an indication of the system performance provided by controlling the prefetcher engines 14 according to the selected prefetcher configuration during the previous processing interval, which has just finished. The score may be computed according to any suitable function based on one or more of the performed measurements.

In some embodiments, the score may be computed as follows:

$$\text{Score} = IPC - IPC * \left(Pwr_{ratio_{MPC}}\right)/2$$

where:

$$Pwr_{ratio_{MPC}} = \frac{P_{Coeff} * MPC * \text{Core}_f}{\text{Core}_{Power}}$$

and $\text{Core}_{power}$ is average core power (e.g., per application), $\text{Core}_f$ is average core frequency, $P_{coeff}$ is the power cost in Joules for a single memory transaction, IPC is instructions per cycle, and MPC is memory transactions per cycle. The above score computation assumes that there is a substantial power saving by decreasing memory transactions, and that saved power may be transferred to speed up the CPU clock thus obtaining greater performance. The above score provides a way to maximize IPC and minimize MPC, for example.

The processor 12 is configured to compute a potential reward of selecting a given configuration (e.g., the configuration being used in the previous processing interval) of the prefetcher engines 14 (block 214). In some embodiments, the processor 12 is configured to compute the potential reward of selecting the given configuration (e.g., the configuration being used in the previous processing interval) of the prefetcher engines 14 based on previous performance scores from previously controlling the prefetcher engines 14 according to the given configuration. For example, if the configuration used in the previous processing interval is configuration A, then the processor 12 computes the score for configuration A in the step of block 212, and then the processor 12 computes the potential reward of selecting configuration A in the future based on the computed score for configuration A and previously computed scores for configuration A computed in other previous processing intervals. In some embodiments, the processor 12 is configured to compute the potential reward of selecting the given configuration of the prefetcher engines 14 based on an average of previous performance scores from previously controlling the prefetcher engines (in previous processing intervals) according to the given configuration. In some embodiments, the processor 12 is configured to compute the potential reward of selecting the given configuration of the prefetcher engines based on an aged average of the previous performance scores, as described in more detail below.

The processor 12 may run multiple software applications in serial or parallel. When different applications run in serial, ideally the machine learning agent 24 detects a new application and adapts accordingly. However, the application boundary is typically unknown to the processor 12. Such a case is known as a non-stationary environment where the best configuration is changed over time. A naïve solution is to periodically reset the states of the machine learning agent 24, for example, so that old performance scores are deleted. While this is a valid solution, it assumes that all applications have the same duration. Therefore, in some embodiments, the machine learning agent 24 is configured to compute the potential reward of selecting a given configuration based on previous performance scores using a time-based exponential moving average over all the previous scores. The time-based exponential moving average decays the historical scores while giving more weight to new scores. A state of the machine learning agent 24 (e.g., the potential reward of selecting a given configuration) may be updated (with decay) when that state is provided with a score. Hence, a decay factor (alpha) is a function of the time interval between the current score and the last score provided for a given configuration, and the aged average potential reward for a given configuration may be computed as:

$$[(1-\text{alpha}(dt))\times\text{previous aged average potential reward}]+[\text{alpha}(dt)\times\text{current score for given configuration}],$$

$$\text{where alpha}(dt)\text{ is defined based on the expected duration of an application.}$$

Any suitable method may be used to compute the potential reward of selecting a given configuration. In some embodiments, the processor 12 is configured to compute the potential reward of selecting a given configuration of the prefetcher engines 14 based on maximizing executed instructions per cycle. Additionally, or alternatively, the processor 12 is configured to compute the potential reward of selecting the given configuration of the prefetcher engines 14 based on minimizing memory transactions per cycle. In general, the processor 12 may be configured to compute a potential reward of selecting a given configuration of the prefetcher engines 14 based on previous performance scores from previously controlling the prefetcher engines 14 according to the given configuration, where the previous performance scores are based on any one or more of the following: executed instructions per cycle; memory transactions per cycle; power cost per memory transaction; average core frequency; average core power; power budget; and measured temperature (e.g., of the processor). The power budget may be the amount of power allowed to be used due to other (e.g., higher level) considerations.

In some embodiments, when multiple applications run in parallel on the processor 12, an instance of the machine learning agent 24 (e.g., a multi-armed bandit context) is attached to each application and a context switch is configured to switch a machine learning agent (e.g., bandit) context as any other context information is exchanged.

In some embodiments, different multi-armed bandit types or configurations may be optimized for different applications. Another layer of machine learning may perform additional explorations and use the best bandit type for a running application.

The size of the time window of each processing interval is selected carefully. If the time window is too small, then the data provided to the machine learning agent 24 may be too noisy. If the time window is too large, then it may take much more time for the machine learning agent 24 to converge on the best configuration, hence reducing overall performance. In some embodiments, the size of the time window may be set to a value in the range of 10 microseconds to 10 milliseconds. The size of the time window may be application dependent. An application may be divided into checkpoints which represent large sequences of instructions which may be repeatedly run while the application is executed. The checkpoint size (or average checkpoint size) may be indicative of an optimal time window for a given application. In other words, the time window may be the same order of magnitude as the average checkpoint size. Each checkpoint may have a weight based on the number of times that checkpoint reoccurs in the application. The checkpoint weights may also be used to compute the average checkpoint size.

In practice, some, or all of the processor 12 may be combined in a single physical component or, alternatively, implemented using multiple physical components. These physical components may comprise hard-wired or programmable devices, or a combination of the two. In some embodiments, at least some of the functions of the processor 12 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 3:
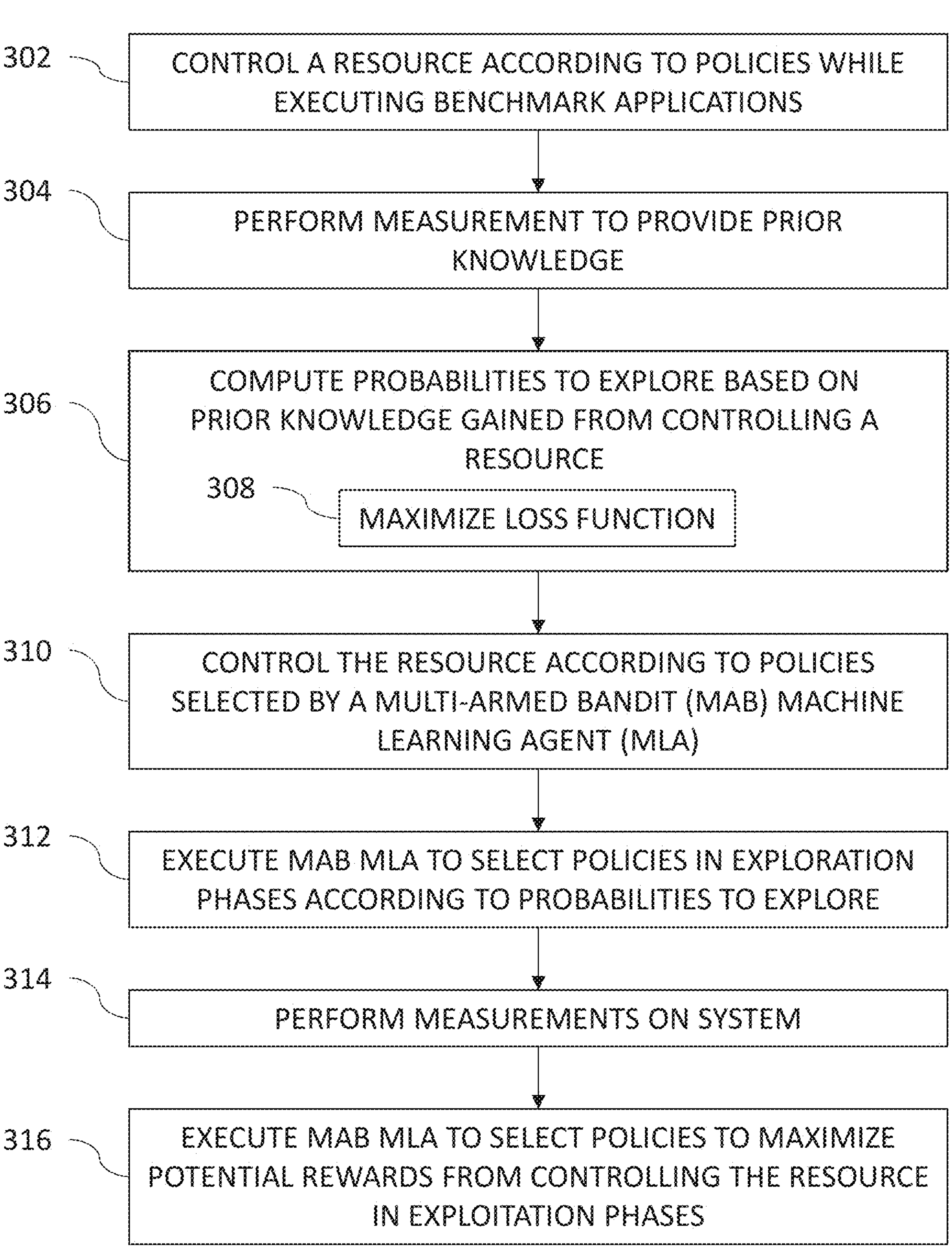
FIG. 3 is a flowchart including steps in a method of operation of a multi-armed bandit learning agent for use with the device of FIG. 1.

Reference is now made to FIG. 3, which is a flowchart 300 including steps in a method of operation of the multi-armed bandit learning agent 24 for use with the device 10 of FIG. 1. The machine learning agent 24, as previously described with reference to FIGS. 1 and 2, is implemented to select configurations of the prefetcher engines 14. It should be noted that the method described with reference to FIG. 3 represents a general multi-armed bandit (MAB) improvement and may be applied to any suitable MAB which is implemented to select policies for controlling a resource. In some embodiments, the policies may be configurations, e.g., configuration of the prefetcher engines 14 or any suitable preprocessor engines. In some embodiments, the resource may include the prefetcher engines 14 or any suitable preprocessor engines.

As previously described with reference to FIG. 1, the machine learning agent 24 selects configurations or policies to apply in the exploration phases based on a suitable scheme. Some schemes treat all policies as having equal importance by randomly selecting the policies to apply in the exploration phases. For example, if there is a probability to explore of epsilon and there are m policies, then the probability to explore a given policy is epsilon divided by m and is uniform among all the policies.

Embodiments of the present invention do not treat all policies as being equal, the machine learning agent 24 may be configured to bias exploration towards policies which based on prior knowledge are more beneficial than other policies and have lower chances of being damaging. Although, the benefits and losses of selecting different policies for a current scenario in unknown, prior knowledge based on a large set of examples (e.g., benchmark applications) provides data regarding the benefits and losses of selecting different policies, including what are the negative impacts in a worst-case scenario. The prior knowledge may be used to provide a probability for each of the policies for exploration. The machine learning agent 24 may then be configured to select policies for exploration based on the corresponding probabilities of the policies, as described in more detail below.

There is a tradeoff regarding probability. If the probability of a given policy is high and the system is already in a steady state with another policy, then to explore that given policy will be harmful. If a given policy has a low probability and will eventually become the steady state policy, then it will take a long time to reach steady-state due to the low probability of the policy, as the policy will only be explored at a very low rate. The fact that the probability is low in this case is harmful. Therefore, a high probability policy may be harmful in steady state, and a low probability may be harmful in the transient state (prior to the steady state being reached).

Embodiments of the present invention compute the probabilities to explore based on addressing the drawbacks described above so that policies with a good chance to significantly harm a measure or measures of system performance (e.g., instructions per cycle (IPC)) should have a lower probability to be explored, and this has to be compared with the chance of the policies to significantly improve the measure(s) of system performance.

The following description with reference to FIG. 3 provides an overview of computing the probabilities to explore and using the probabilities in the device 10 of FIG. 1, or any suitable device or system. Following the overview there is a detailed description describing two methods to compute the probabilities.

In some embodiments, the processor 12 is configured to control a resource (e.g., prefetcher engines 14) according to different policies (e.g., different configurations of the resource), while executing benchmark applications (block 302). For example, the processor 12 may be configured to control the resource according to policy A for benchmark applications 1-10, and also control the resource according to policy B for benchmark applications 1-10, and so on. The processor 12 is configured to measure system performance during the execution of the benchmark applications while different policies are applied to the resource (block 304). The measurements provide prior knowledge including, for each policy, measurements of system performance for different ones of the benchmark applications or different parts (e.g., checkpoints) of the benchmark applications. For example, the prior knowledge may include system performance (e.g., IPC for policy A for benchmark application 1, IPC for policy A for benchmark application 2, and so on, and IPC for policy B for benchmark application 1, IPC for policy B for benchmark application 2, and so on, for all the policies and all the benchmark applications.

The following description describes computing the probabilities to explore using processing circuitry 26 of device 10. In some embodiments, the processing circuitry 26 may be included in the processor 12. In other embodiments, the processing circuitry 26 may be an additional element in device 10 (as shown in FIG. 1) or in a different device. The processing circuitry 26 is configured to compute the probabilities to explore with the corresponding policies based on the prior knowledge gained from controlling the resource (e.g., prefetcher engines 14) according to the policies while executing benchmark applications (block 306). The processing circuitry 26 is configured to compute the probability to explore with any given policy of the policies based on prior knowledge of extent of success and failure of the given policy while executing the benchmark applications. The processing circuitry 26 is configured to compute the probability to explore with the given policy such that the probability to explore with the given policy optimizes (e.g., maximizes or minimizes) a loss function representing a system parameter to be optimized (block 308). The loss function may include a parameter which compares: (a) a first value of a quality metric when the given policy is applied during execution of a given benchmark application; with (b) a second value of the quality metric of the best policy, which is one of the policies providing a highest value of the quality metric among the policies applied during execution the given benchmark application. See equation 2 below for an example of a suitable loss function. The loss function may include any one or more of the following parameters: an empiric parameter which measures the average or distribution of a number of times given policies have to be explored in order to identify the relative quality of the given policies compared with other ones of the policies for the given benchmark application; a weight of the given benchmark application with respect to other ones of the benchmark applications; and a number of checkpoints (or a similar measure of length of the application) in the given benchmark application.

In some embodiments, the processing circuitry 26 is configured to compute the different probabilities to explore with the corresponding policies such that the probabilities to explore optimize (e.g., maximize or minimize) a loss function representing a system parameter to be optimized. See equation 10 below for an example of a suitable loss function representing different policies (and not treating each policy separately as described in equation 2). The loss function of equation 10 includes a first term that represents the loss of benefit due to the time taken during exploration (during execution of the benchmark applications) for the multi-armed bandit machine learning agent to find ones of the policies that are better than other ones of the policies. The loss function of equation 10 includes a second term that represents the loss of benefit due to exploration (during execution of the benchmark applications) with sub-optimal policies. Sub-optimal policies are policies that are not the best policy for a particular benchmark application.

The processing circuitry 26 is configured to compute the different probabilities to explore with the corresponding policies based on an expression formed by comparing a derivative of the loss function to zero. For example, see equations 3, 4, 11 and 12 below.

The following overview describes the use of the computed probabilities to explore by the machine learning agent 24 or any suitable multi-armed bandit machine learning agent. The processor 12 is configured to control a resource according to policies selected by multi-armed bandit machine learning agent 24 in exploration phases and in exploitation phases (block 310).

In some embodiments, the resource may include prefetcher engines 14 configured to predict next memory access addresses of the memory 16. Each of the prefetcher engines 14 are configurable to provide a level of aggressiveness, as described above with reference to FIG. 1. The policies may correspond to different configurations of the prefetcher engines 14.

The processor 12 is configured to execute the multi-armed bandit machine learning agent 24 to select from the policies to control the resource in the exploration phases (e.g., while executing a software application, such as software application 20) according to probabilities to explore corresponding one of the policies, wherein the probabilities include different probabilities (block 312). The processor 12 is configured to perform measurements on the system (e.g., on the device 10) during execution of the multi-armed bandit machine learning agent 24 (block 314) during exploration phases and optionally during exploitation phases. The performed measurements may include any one or more of the following: executed instructions per cycle; memory transactions per cycle; power cost per memory transaction; average core frequency; average core power; and measured temperature (e.g., of the processor 12). The processor 12 is configured to execute the multi-armed bandit machine learning agent 24 to select from the policies to maximize potential rewards from controlling the resource in exploitation phases based on the performed measurements (block 316).

The following detailed description describes a first method to compute the probabilities to explore. It should be noted that the following examples assume that the metric to be maximized is IPC. However, any other suitable metric or metrics may replace IPC. For example, the natural logarithm (ln) of IPC may be maximized.

Definitions of terms used in the first method now follow.

- $P^p$ is the probability to choose policy p.
- i is an index of benchmark application i, which provides prior knowledge for policy p.
- $w_i$ is the weight of application i relative to the other benchmark applications. This is a statement of how important benchmark application i is in the optimization and may be provided by the system administrator.
- $N_i$ is the total number of checkpoints (not just different number of checkpoints) in application i.
- $IPC^p_i$ is the compound IPC of policy p in application i based on prior knowledge. The compound IPC may include any suitable factor that affects the IPC. For example, the compound IPC may include the impact of the number of memory transactions. If there are too many memory transactions, power consumption increases, resulting in the system reacting by decreasing clock frequency which leads to a decreased rate of instructions per second.
- $IPC^B_i$ the compound IPC of the best policy (excluding where B=p) for application i. The best policy for application i is the policy providing the highest IPC for application i.
- $\Delta_i$=abs(ln($IPC^p_i$)−ln($IPC^B_i$)) is Equation 1, which compares IPC for a given policy p and the IPC for the best policy B for an application i. $\Delta_i$ represents the loss of choosing policy p over the best policy B for application i. A convenient metric to use is the natural logarithm (ln) of the IPC which provides accurate results.
- $i \in B$ indicates summing over all applications i where for each i $IPC^p_i$ is greater than $IPC^B_i$ i.e., summing over all application i where policy p is the best policy for that application i (i.e., if for application i, the IPC with policy p is greater than the IPC of other policies). It should be noted that as $IPC^B$, is defined as the compound IPC of the best policy (excluding where B=p) for application i, $IPC^p_i$ can be greater than $IPC^B_i$ when $IPC^B$, is the second-best policy for application i.
- $i \in NB$ indicates summing over all applications i where $IPC^p_i$ is less than $IPC^B_i$ i.e., summing over all applications i where policy p is not the best policy for this application i.

Therefore, the benefit of adding policy p to a prior set of policies for which the policy p did not previously participate for exploring is given by:

$$B^p = \sum_{i \in B}\left(1 - \frac{1}{N_i p^p}\right) w_i \Delta_i - \sum_{i \in NB} p^p w_i \Delta_i. \quad \text{(Equation 2)}$$

In the first term, the summation is performed for the different applications i for policy p. However, the summation is only performed for terms where policy p is the "best" policy for application i based on the prior knowledge. As IPC is application dependent, policy p could be the best in zero, or one or more applications and in others not etc.

The "1" in the first term represents the portion of the time the policy p provides benefit for being the best policy. The "minus" portion in the first term represents the portion of the time that policy p does not provide benefit as being the best policy due to the transient period in which policy p is not used in the exploitation phase due to the exploration time periods in which the system takes time to understand that policy p is the best policy. Each benchmark application is divided into $N_i$ checkpoints, and at the beginning of each checkpoint, the system may decide which policy to use, e.g., for exploration. The value $N_i$ in the first term considers how many checkpoints will be "wasted" on average to realize that policy p is the best.

In the second term, the summation is performed for applications i where the current policy is worse than the best policy. Therefore, if the policy p is not the best policy, then by selecting policy p for exploration a loss is accrued in the steady state. The proportion of time being lost by exploring with policy p is the probability $P^p$ of exploring with policy p, and the amount lost is given by A If policy p is the best policy, then there is no loss by exploring with it and therefore in these cases it will not be included in the second term.

The optimal probability, $P^p$, for choosing policy p for exploring may be found by calculating the derivative of equation 2.

The derivative of equation 2 is given by:

$$\sum_{i \in B} \frac{1}{N_i {p^p}^2} w_i \Delta_i - \sum_{i \in NB} w_i \Delta_i = 0. \quad \text{(Equation 3)}$$

Therefore, the optimal probability, $P^p$, for choosing policy p for exploring based on the prior knowledge is given by:

$$\sqrt{\frac{\sum_{i \in B} \frac{w_i \Delta_i}{N_i}}{\sum_{i \in NB} w_i \Delta_i}}. \quad \text{(Equation 4)}$$

Therefore, the probability of choosing policy p is based on prior knowledge of success and failure of policy p to control the resource (e.g., the prefetcher engines 14) while the benchmark applications i are being executed.

Based on the above, prior knowledge gained during execution of the benchmark applications i is used to compute the probability of each policy (using equation 4). During execution of another application Q (not one of the benchmark applications), the machine learning agent 24 selects policies to use during exploration based on the computed probabilities. Knowledge gained during running on current application Q does not affect the computed probabilities. Knowledge gained during running on current application Q will affect what policy is selected during the exploitation phase based on the multi-armed bandit algorithm searching for best policies.

The decision of the machine learning agent 24 as to whether to explore or exploit may be based on an epsilon which may be defined as the sum of the computed probabilities as follows:

$$\varepsilon = \sum p^j. \quad \text{(Equation 5)}$$

In other words, the probabilities define epsilon.

In another approach, epsilon is predefined, and the probabilities are normalized among the predefined epsilon:

$$\widetilde{p^p} = \frac{p^p}{\sum p^j} \varepsilon. \quad \text{(Equation 6)}$$

In some embodiments, the processor 12 or the processing circuitry 26 may be configured to perform an offline process which may select another policy from a selection of policies to be added to a current group of policies. The process includes computing $p^p$ or $\widetilde{p^p}$ or each candidate policy to add to the group of policies using equation 4, and computing $B^p$ for each candidate (which considers the performance of the policies for the benchmark applications i) using equation 2. The process then chooses the candidate with the best $B^p$ and adds the best candidate to the group.

Due to noise the best policy may not be identified on the first exploration of that policy. A given policy for a given application may not behave deterministically each time it is applied and may not behave as the best policy even if on average it is the best. Therefore, a new factor m may be introduced to account for this factor. "m" is a heuristic parameter assuming the average number of times a policy has to be explored in order to be identified as best.

Introducing parameter "m" gives:

$$B^p = \sum_{i \in B} \left(1 - \frac{m}{N_i p^p}\right) w_i \Delta_i - \sum_{i \in NB} p^p w_i \Delta_i, \text{ and} \quad \text{(Equation 7)}$$

-continued $$p^p = \sqrt{\frac{m \sum_{i \in B} \frac{w_i \Delta_i}{N_i}}{\sum_{i \in NB} w_i \Delta_i}}, \text{ and} \quad \text{(Equation 8)}$$

$$\epsilon = \sqrt{m} \sum_p \sqrt{\frac{\sum_{i \in B} \frac{w_i \Delta_i}{N_i}}{\sum_{i \in NB} w_i \Delta_i}}. \quad \text{(Equation 9)}$$

The following detailed description describes a second method to compute the probabilities to explore. Definitions of terms used in the second method now follow.

- $w_i$ is the weight of application i relative to the other applications.
- $N_i$ is the total number of checkpoints in application i.
- N is the number of policies.
- d is the default policy (i.e., the policy chosen to start with for exploitation). This may be based on the policy with the highest average IPC or may be selected arbitrarily.
- $IPC^p{}_i$ is the (compound) IPC of policy p for application i.
- $P^p$ is the probability to choose policy p.
- $p_i(k)$ is the $k^{th}$ best policy for application i. For example, $p_i(1)$ is the best policy for application i, $p_i(2)$ is the second-best, and $p_i(N)$ is the worst.
- $n_i^p$ is the rank of policy p in application i. For example, $n_i^p=1$ for the best policy, $n_i^p=2$ for the second best, and $n_i^p=N$ for the worst.
- $m_i(n)$ is an empiric parameter. $m_i(n)$ is the (average) number of times one of the n best policies of application i has to be explored in order to identify that one of the n best policies is the best policy for application i. For example, $m_i(1)$ is the (average) number of times the best policy of application i has to be explored to identify the best policy as the best for application i. $m_i(2)$ is the (average) number of times the best policy or the second best policy for application i has to be explored to identify the best policy or the second best policy as the best policy. This is also prior knowledge. $m_i(1)$ may be found by running machine learning agent 24 with application i to see how times the best policy has to be explored to identify that the best policy as the best. $m_i(2)$ may be found by running machine learning agent 24 with application i to see how times the best policy or the second-best policy has to explored to identify that the best policy or the second-best policy as the best policy, respectively. This may be repeated, and an average taken. A similar analysis may be performed for other values of $m_i(n)$.
- $\Delta_i(n)=\ln(IPC^{pi(n)}{}_i)-\ln(IPC^{pi(n+1)}$ and provides the advantage of the policy with rank n over the next best ranking policy.
- $\hat{\Delta}_i^p=\ln(IPC^{pi(1)}{}_i)-\ln(IPC^p{}_i)$ indicates an undesirable effect of exploring an undesirable policy compared to the best policy. $IPC^{p(i(1)}$ is the compound IPC with the best policy for application i.

The loss function representing the combined impact of all the policies is given by:

$$\left(L = \text{Potential} - \sum_i \sum_{n=1}^{n_i^d - 1} \frac{w_i}{N_i} \frac{m_i(n)\Delta_i(n)}{\sum_{k=1}^{n} P^{p_i(k)}} - \sum_i \sum_p w_i P^p \hat{\Delta}_i^p\right). \quad \text{(Equation 10)}$$

Equation 10 provides the impact of all the policies, whereas equation 2 considers the policies individually.

Equation 10 is more accurate. Broadly speaking, the 3 terms in equation 10 correspond to the terms in equation 2. For example, the "potential" corresponds to "1" in the first term of equation 2, the second term corresponds to the second half of the first term of equation 2, and the third term corresponds to the second term of equation 2.

The potential included in equation 10 is the contribution of all the best policies for the respective applications assuming they are chosen correctly. It is defined as:

$$\text{Potential} = \sum_i w_i \ln\left(IPC_i^{p_i(1)}\right)$$

It will be seen below that the potential is unimportant as it disappears (e.g., equals zero) upon differentiation of equation 10 as shown in equation 11. It is the weighted sum of the natural logarithm of the IPCs of the best policies for the respective applications.

The middle term of equation 10:

$$\sum_i \sum_{n=1}^{n_i^d-1} \frac{w_i}{N_i} \frac{m_i(n)\Delta_i(n)}{\sum_{k=1}^{n} P^{p_i(k)}}$$

describes the effect of the transient and represents the portion of time that there is no benefit from better policies (or the best policy) due to the transient period in which a better policy (or the best policy) is not be used in the exploit phase due to the exploration period in which the system takes time to understand that the better policy or policies are better.

As stated above, $n_i^p$ is the rank of policy p in application i (for example, $n_i^p=1$ for the best policy, $n_i^p=2$ for the second best and $n_i^p=N$ for the worst), and d is the default policy. Therefore, $$n_i^d$$

is the rank of the default policy for application i.

If the default policy is the best policy, then $$n_i^d$$

is equal to 1. In that case, $$\left(n_i^d - 1\right)$$

is equal to zero and summation does not happen for that application as there is no detrimental effect of the transient for that application.

If the default policy is the second-best policy, then $$n_i^d$$

is equal to 2. In that case, $$\left(n_i^d - 1\right)$$

is equal to 1 as there is only one policy which is important in the transient and this is the best policy.

When n=1 (i.e., the best policy for this application), then the middle term is equal to:

$$\frac{w_i}{N_i} \frac{m_i(1)\Delta_i(1)}{\sum_{k=1}^{1} P^{p_i(k)}}$$

and $\Delta_i(1)=\ln(IPC^{pi(1)}_i)-\ln(IPC^{pi(2)}_i)$ which represents the advantage of the best policy over the next best policy.

Therefore, when k=1, the middle term is equal to:

$$\frac{w_i}{N_i} \frac{m_i(1)\Delta_i(1)}{P^{p_i(1)}}$$

Where $P^{p_i(1)}$ is the probability of the best policy for application i.

Therefore, the above term gives the effect in the transient from moving from the second-best policy to the best policy.

If the default policy is the third best policy, then $$n_i^d$$

is equal to 3. In that case, $$\left(n_i^d - 1\right)$$

is equal to 2 as there are two policies better than the default policy in the transient. Therefore, the middle term is summed from n=1 to n=2 for application i. The term when n=1 was shown above.

When n=2, the middle term is equal to:

$$\frac{w_i}{N_i} \frac{m_i(2)\Delta_i(2)}{\sum_{k=1}^{2} P^{p_i(k)}}$$

where $\Delta_i(2)=\ln(IPC^{pi(2)}_i)-\ln(IPC^{pi(3)}_i)$ and $$\sum_{k=1}^{2} P^{p_i(k)}$$

is equal to $P^{p_i(1)}-P^{p_i(2)}$, where $P^{p_i(2)}$ is the probability of the second-best policy for application i. Therefore, $P^{p_i(1)}+P^{p_i(2)}$ is the probability of choosing policy 1 or policy 2 for application i.

Therefore, $$\frac{w_i}{N_i} \frac{m_i(2)\Delta_i(2)}{\sum_{k=1}^{2} P^{p_i(k)}}$$

provides a term for the effect in the transient from moving from the third best policy to the second-best policy or to the best policy.

The final term of equation 10:

$$\sum_i \sum_p w_i P^p \hat{\Delta}_i^p$$

performs a summation for each application i and each policy p in each application i, where the policies lead to undesirable results as they are not the best policies for the applications in question. The final term sums for a given application i, the product of: a weight $w_i$ of the application, a probability $P^P$ of a policy being explored for that application, and an undesirable effect of exploring an undesirable policy equal to $$\hat{\Delta}_i^p,$$

which may equal to zero if it is the best policy and therefore does not contribute to the final term.

Differentiating equation 10 and comparing the derivative as a function of $P^P$ to zero gives:

$$\sum_i \sum_{n=n_i^p}^{n_i^d-1} \frac{w_i}{N_i} \frac{m_i(n)\Delta_i(n)}{\left(\sum_{k=1}^{n} P^{p_i(k)}\right)^2} - \sum_i w_i \hat{\Delta}_i^p = 0. \quad \text{(Equation 11)}$$

The above defines N equations with N variables. The solution of equation 11 does not seem to be analytic and appears to indicate a solver to determine the probability for each policy. Equation 11 may be "solved" based on defining a default policy and knowing for each application whether that policy is the best, second-best and so on.

Alternatively, it may be assumed that the default policy is the worst selection, and the summation may be assumed to run to N−1, instead of $$(n_i^d - 1),$$

so equation 11 becomes:

$$\sum_i \sum_{n=n_i^p}^{N-1} \frac{w_i}{N_i} \frac{m_i(n)\Delta_i(n)}{\left(\sum_{k=1}^{n} P^{p_i(k)}\right)^2} - \sum_i w_i \hat{\Delta}_i^p = 0. \quad \text{(Equation 12)}$$

The description below with reference to FIGS. 4-20 refers to prefetcher engines 14, aggressiveness levels, and prefetcher engine configurations. In some embodiments, the prefetcher engines 14 may be replaced by any suitable preprocessor engines, the aggressiveness levels may be replaced by any suitable settings, and the prefetcher engine configurations may be replaced by any suitable configurations or policies.

Figure 4:
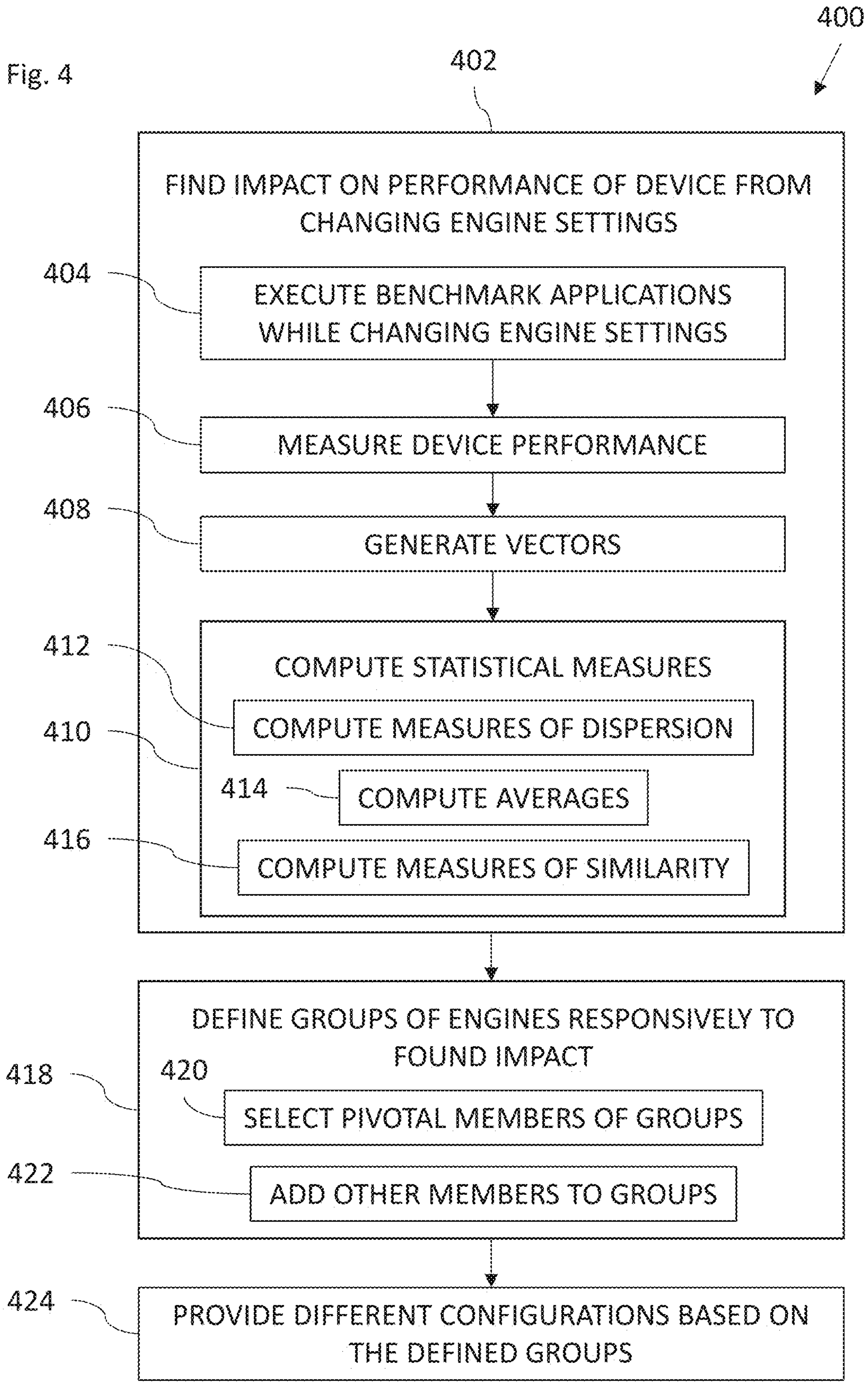
FIG. 4 is a flowchart including steps in a method to reduce a number of configurations for use in the device of FIG. 1.

Reference is now made to FIG. 4, which is a flowchart 400 including steps in a method to reduce the number of configurations for use in the device 10 of FIG. 1. The processor 12 is configured to find an impact on performance of the device 10 from changing settings (e.g., aggressiveness levels) of prefetcher engines 14 applied to benchmark applications being executed by the device 10 (block 402). In some embodiments, the processor 12 is configured to find the impact on performance based on measured performance of the device 10. The step of block 402 may include any one or more of the steps of blocks 404-416 described with reference to FIGS. 5-7 below.

Figure 5:
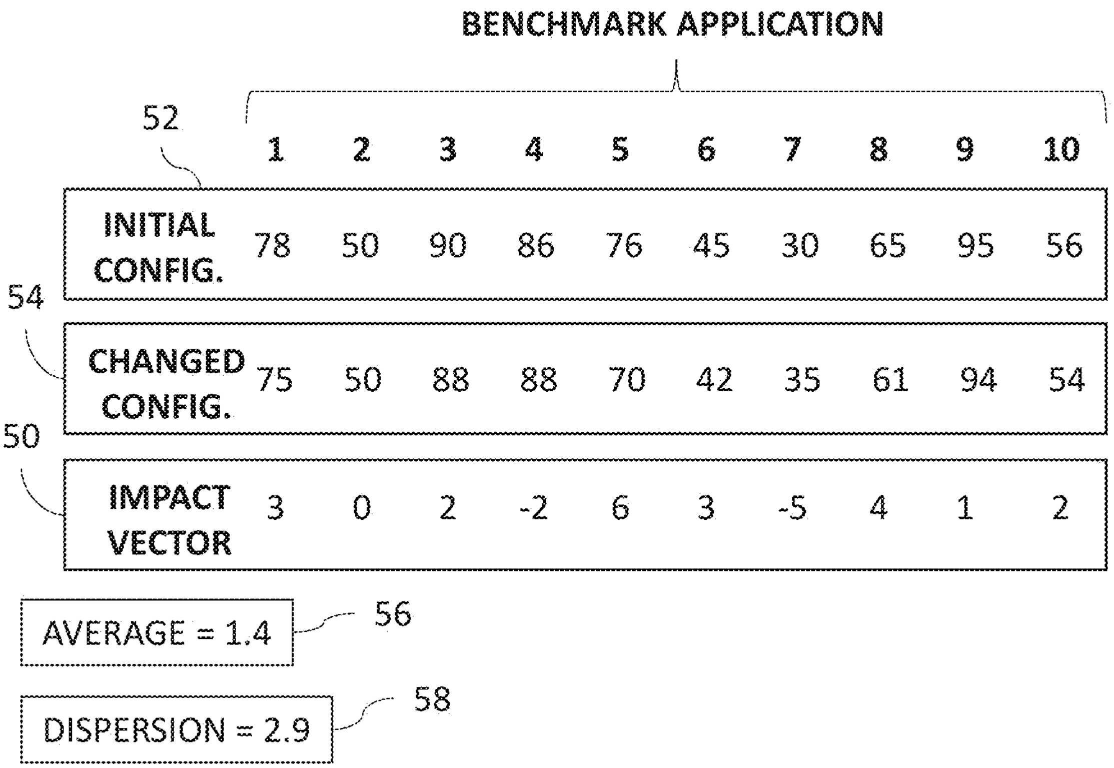
FIG. 5 is a view illustrating computation of a vector for use in the method of FIG. 4.

Reference is now made to FIG. 5, which is a view illustrating computation of a vector 50 for use in the method of FIG. 4. Reference is also made to FIG. 4.

The processor 12 is configured to execute the benchmark applications while changing the settings of the prefetcher engines 14 (block 404). The processor 12 is configured to measure the performance of the device 10 during the execution of the benchmark applications (block 406). The steps of blocks 404 and 406 are now described in more detail. The processor 12 executes the benchmark applications (e.g., in series, one after the other) with an initial configuration of the prefetcher engines 14 such that the prefetcher engines 14 have their aggressiveness levels set to a given level (for example, the highest aggressiveness level, level 3). The processor 12 measures the performance of the device 10 during execution of each benchmark application. The performance may be measured using any suitable measurement(s) and may include computing a score of performance, as described above with reference to FIG. 2. FIG. 5 shows a vector 52 including performance measurements for 10 corresponding benchmark applications 1-10. For example, the score for benchmark application 1 is equal to 78, and the score for benchmark application 2 is equal to 50, and so on. The aggressiveness level of one of the prefetcher engines 14 (e.g., prefetcher 1) is then changed (for example, from level 3 to level 2) yielding a changed configuration of the prefetcher engines 14. The processor 12 then executes the benchmark applications (e.g., in series, one after the other) with the changed configuration of the prefetcher engines 14. The processor 12 measures the performance of the device 10 during execution of each of the benchmark applications. FIG. 5 shows a vector 54 showing performance measurements for the 10 corresponding benchmark applications based on the changed configuration. For example, the score for benchmark application 1 is equal to 75, and the score for benchmark application 2 is equal to 50, and so on.

The processor 12 is configured to generate vector 50 from vector 52 and vector 54. For example, vector 50 is generated by performing an elementwise subtraction of vector 54 from vector 52, where each element is a performance measurement of one of the benchmark applications. Vector 50 describes the impact on the performance of the device 10 of changing settings of one of the prefetcher engines 14 (e.g., prefetcher 1) applied to the benchmark applications being executed by the device 10. The processor 12 then computes an average 56 of the elements in vector 50, and a measure of dispersion 58 (e.g., standard deviation or variance) of the elements in vector 50.

The above steps are performed so that the processor 12 is configured to generate vectors 50 for corresponding ones of the prefetchers engines 14 describing the impact on the performance of the device 10 of changing settings of the prefetcher engines 14 applied to benchmark applications being executed by the device (block 408). For example, based on the initial configuration, the aggressiveness level of another one of the prefetcher engines 14 (e.g., prefetcher 2) is then changed (for example, from level 3 to level 2) yielding a second changed configuration of the prefetcher engines 14. The processor 12 then executes the benchmark applications (e.g., in series, one after the other) with the second changed configuration of the prefetcher engines 14. The processor 12 measures the performance of the device 10 during execution of each of the benchmark applications yielding a second vector 54, and then generates the vector 50 for prefetcher 2 based on the second vector 54 and vector 52, and so on for all the prefetchers. The vectors 50 described above include a value per benchmark application. In some embodiments, the vector 50 may include a value per part of an application, e.g., per checkpoint.

Figure 6:
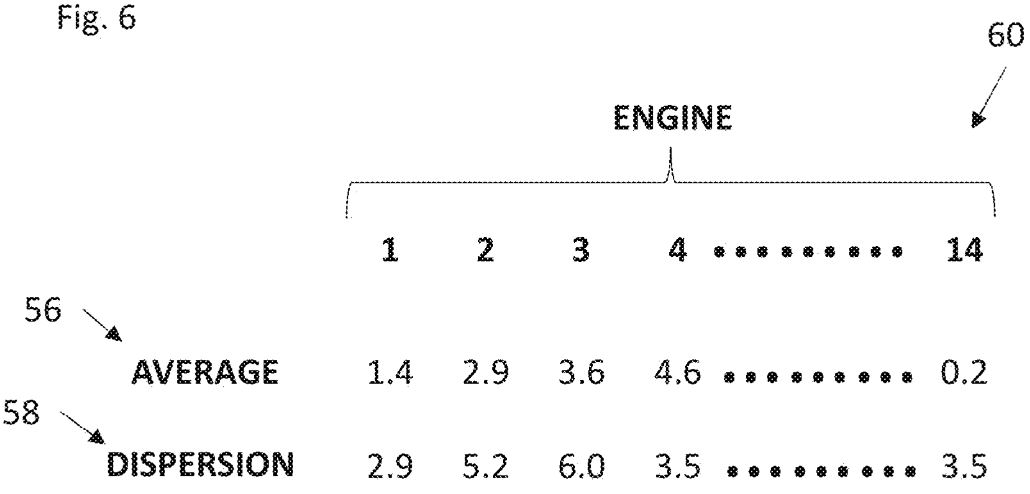
FIGS. 6 and 7 are tables illustrating statistical computations performed in the method of FIG. 4.
Figure 7:
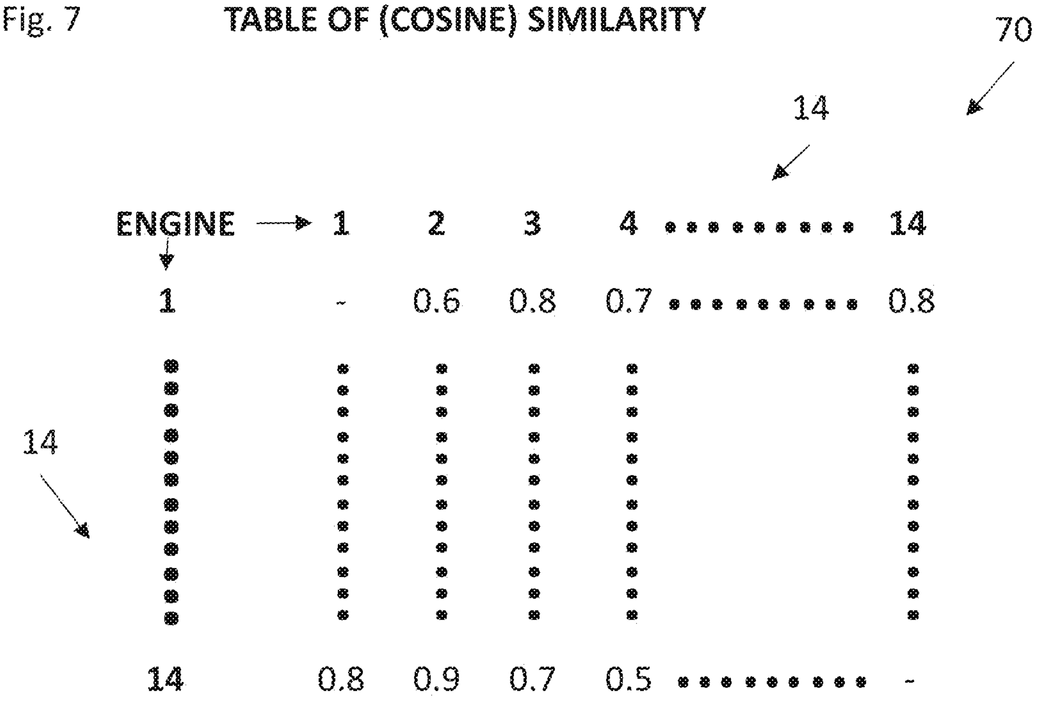

Reference is now made to FIGS. 6 and 7, which are tables illustrating statistical computations performed in the method of FIG. 4. Reference is also made to FIG. 4. The processor 12 is configured to compute statistical measures based on vectors 50 for corresponding prefetchers engines 14 describing the impact on the performance of the device 10 of changing settings of the prefetcher engines 14 applied to benchmark applications being executed by the device 10 (block 410). The step of block 410 includes the steps of blocks 412-416 described in more detail below.

The processor 12 is configured to compute a measure of dispersion 58 for each of the vectors 50 (block 412). For example, a measure of dispersion is computed for the elements of vector 50 of prefetcher 1, and a measure of dispersion is computed for the elements of vector 50 of prefetcher 2, and so on. The measure of dispersion may be a variance or a standard deviation, by way of example. The processor 12 is configured to compute an average 56 of each of the vectors 50 (block 414). For example, an average is computed of the elements of vector 50 of prefetcher 1, and an average is computed of the elements of vector 50 of prefetcher 2, and so on. The averages represent the average impact of the corresponding prefetcher engine 14 on the performance of the device 10. FIG. 6 shows a table 60 of averages 56 and measures of dispersion 58 for corresponding prefetcher engines 14.

The processor 12 is configured to compute measures of similarity between pairs of the vectors 50 (block 416). For example, the processor 12 may compute a measure of similarity between the vector 50 of prefetcher 1 with the vector 50 of prefetcher 2, and another measure of similarity between the vector 50 of prefetcher 1 with the vector 50 of prefetcher 3, and yet another measure of similarity between the vector 50 of prefetcher 2 with the vector 50 of prefetcher 3, and so on for all the pairs of prefetcher engines 14. Each of the measures of similarity may be a cosine similarity or correlation, for example. FIG. 7 shows a table 70, which includes measures of similarity (e.g., cosine similarity) for pairs of prefetcher engines 14. For example, the measure of similarity between prefetcher engine 1 and 2 is equal to 0.6.

In some embodiments, if one or more of the vectors has a high absolute value of the average, the initial configuration may need to be changed and the above process of steps 404-416 repeated based on the new initial configuration. A high average may be determined by comparing the average with the intrinsic noise of the measurement and the granularity of the configuration. A vector with a high measure of dispersion (and a low absolute value of the average) may be interesting for machine learning. If a pair of vectors 50 has a high measure of similarity, then the prefetcher engines 14 associated with this pair of vectors 50 move in a similar way and are good candidates for the same group of prefetcher engines 14. The above observations may be used in selecting the prefetcher engines 14 to group together, as described in more detail with reference to FIGS. 8-10.

The averages, measures of dispersion, and measures of similarity, computed with reference to FIGS. 4-12 may be any suitable averages, measures of dispersion, and measures of similarity. In some embodiments, the averages and/or measures of dispersion, and/or measures of similarity may be weighted to yield weighted averages, weighted measures of dispersion, and/or weighted measures of similarity weighted according to different scenarios (e.g., different benchmark applications, or part thereof) in the vectors. The weights may be assigned according to an estimated significance of each of the scenarios. The weights may be defined by a systems administrator or by any suitable method, for example, the method described with reference to FIG. 21.

Figure 8:
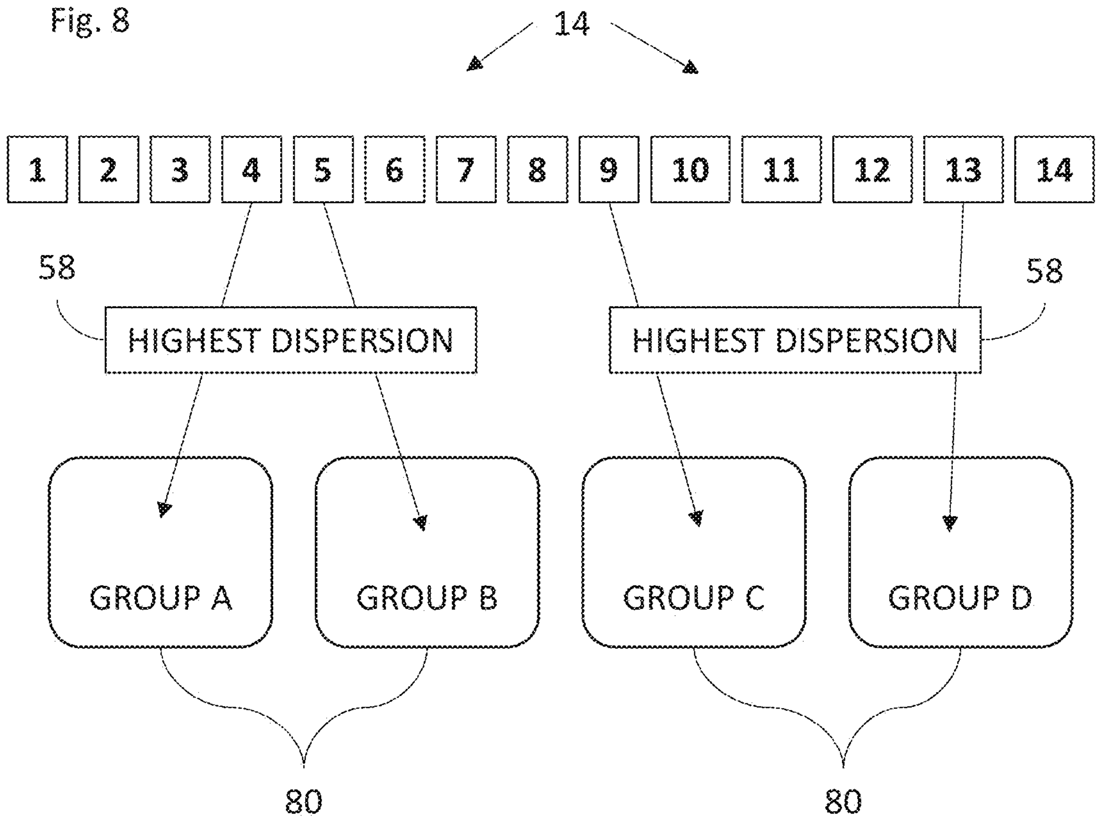
FIGS. 8-10 are views illustrating defining groups in the method of FIG. 4.
Figure 9:
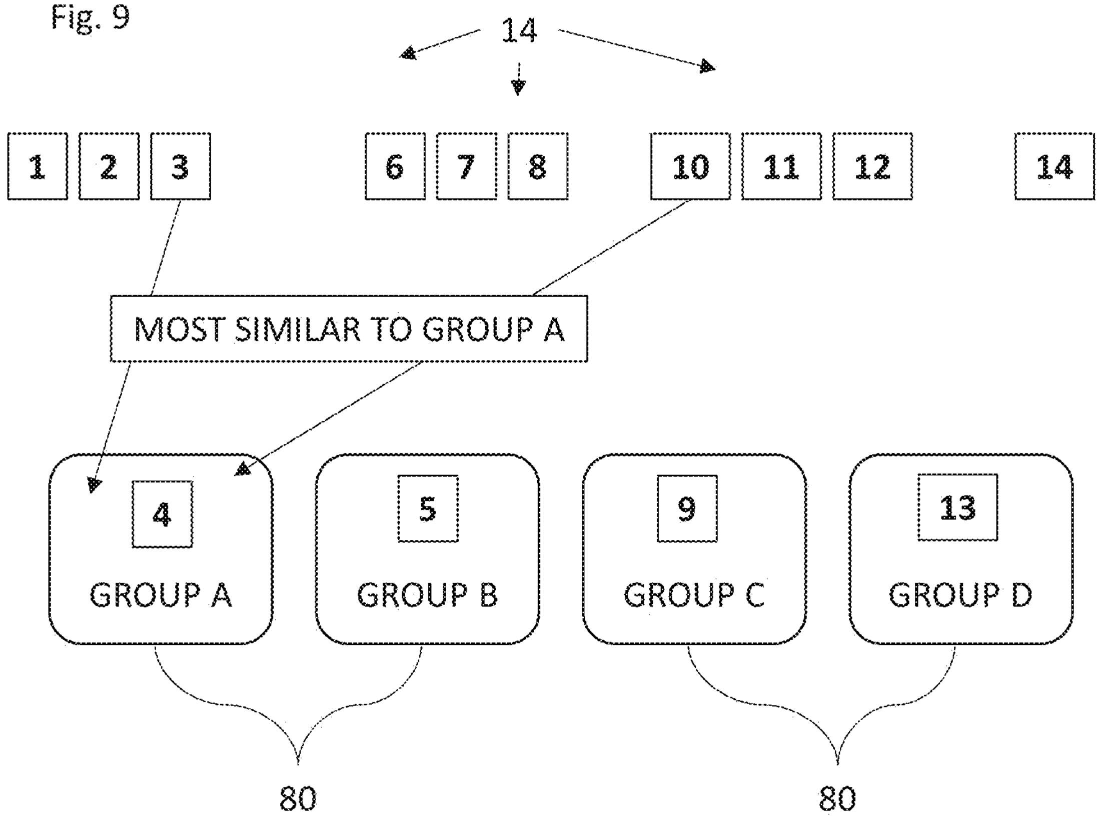
Figure 10:
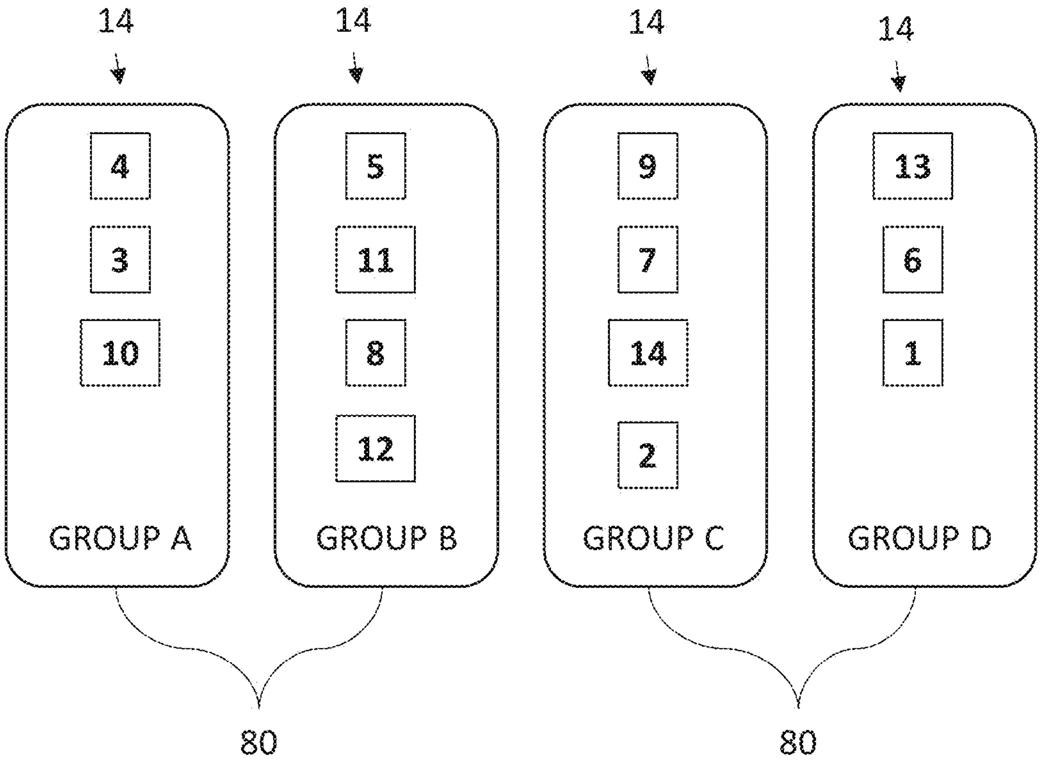

Reference is now made to FIGS. 8-10, which are views illustrating defining groups 80 in the method of FIG. 4. Reference is also made to FIG. 4.

The prefetcher engines 14 having associated vectors 50 with highest measures of dispersion 58 (e.g., highest standard deviations) are generally selected to be pivotal members of different ones of the groups 80, with one pivotal member per group. FIG. 8 shows that prefetcher engines 4, 5, 9, and 13 have the highest measures of dispersion 58 and form the pivotal members of groups A, B, C, and D, respectively. If a pair of the vectors 50 with the highest measures of dispersion 58 has a very high measure of similarity, then the prefetcher engines 14 of this pair of vectors 50 may be assigned to the same group and another prefetcher engine 14 with a next highest measure of dispersion 58 is assigned as a pivotal member of another group 80.

The prefetcher engines 14 which remain unassigned to groups are then assigned to groups 80 based on the highest measures of similarity of the associated vectors (of the unassigned prefetcher engines 14) with the vector(s) of one or more existing members of groups 80 (e.g., with the vectors of the pivotal members of the respective groups 80). FIG. 9 illustrates that prefetcher engines 3 and 10 are added to group A as the vectors 50 of prefetcher engines 3 and 10 are most similar to the vector 50 of prefetcher engine 4 (the pivotal member of group A). FIG. 10 shows the final allocation of the prefetcher engines 14 among groups 80.

Therefore, in general the processor 12 is configured to define groups 80 of the prefetcher engines 14 responsively to the impact on the performance of the device from changing the settings of the prefetcher engines (block 418). In some embodiments, the processor 12 is configured to define the groups 80 based on the computed statistical measures. In some embodiments, the processor 12 is configured to define groups 80 based on the computed measure of dispersion of at least some of the vectors 50 (e.g., the vector 50 with the highest measures of dispersion) and the computed measures of similarity between at least some of the pairs of vectors 50.

In some embodiments, the processor 12 is configured to select pivotal members of the groups 80 such that a different prefetcher engine 14 is selected as a pivotal member of each group 80 based on the measure of dispersion of corresponding vectors 50 (block 420). In some embodiments, the processor 12 is configured to select the pivotal members based on the highest measures of deviation of corresponding vectors 50. In some embodiments, the processor 12 is configured to select the pivotal members based on the measure of dispersion of corresponding vectors 50 while minimizing the measures of similarity between the corresponding vectors 50 of the pivotal members. In other words, if the measure of similarity between a pair of vectors is very high (e.g., close to 1), then the prefetcher engines 14 may be assigned to the same group 80.

In some embodiments, the processor 12 is configured, for each group 80, to add other prefetcher engines 14 to that group based on the measures of similarity of vectors with the vector of the pivotal member of that group (block 422).

In some embodiments, the addition of prefetcher engines 14 may be compared to more than one existing member of a group, and/or even to a member that is not a pivotal member of that group. Therefore, in some embodiments the processor 12 is configured, for each group 80, to add one or more prefetcher engines 14 to that group based on one or more measures of similarity of one or more corresponding vectors (of the prefetcher engine(s) 14 being considered to be added to that group) with one or more vectors of one or more existing members of that group.

Figure 11:
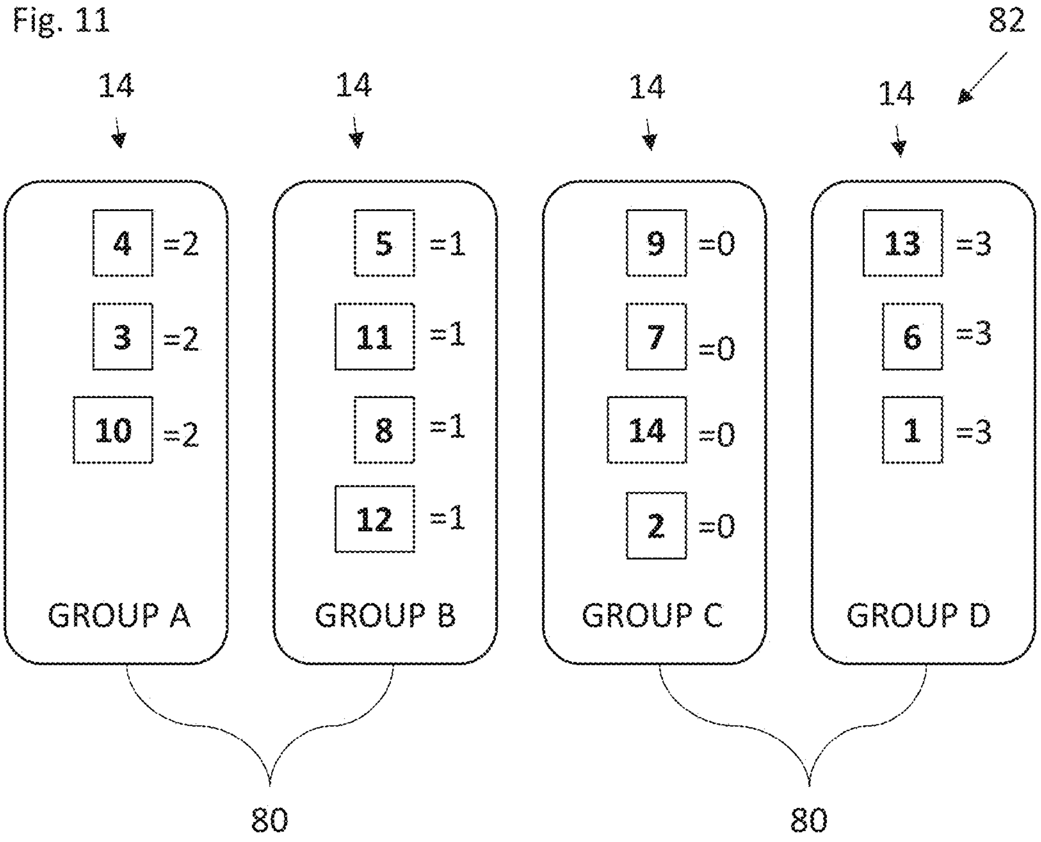
FIGS. 11 and 12 are views illustrating example configurations for use in the method of FIG. 2.
Figure 12:
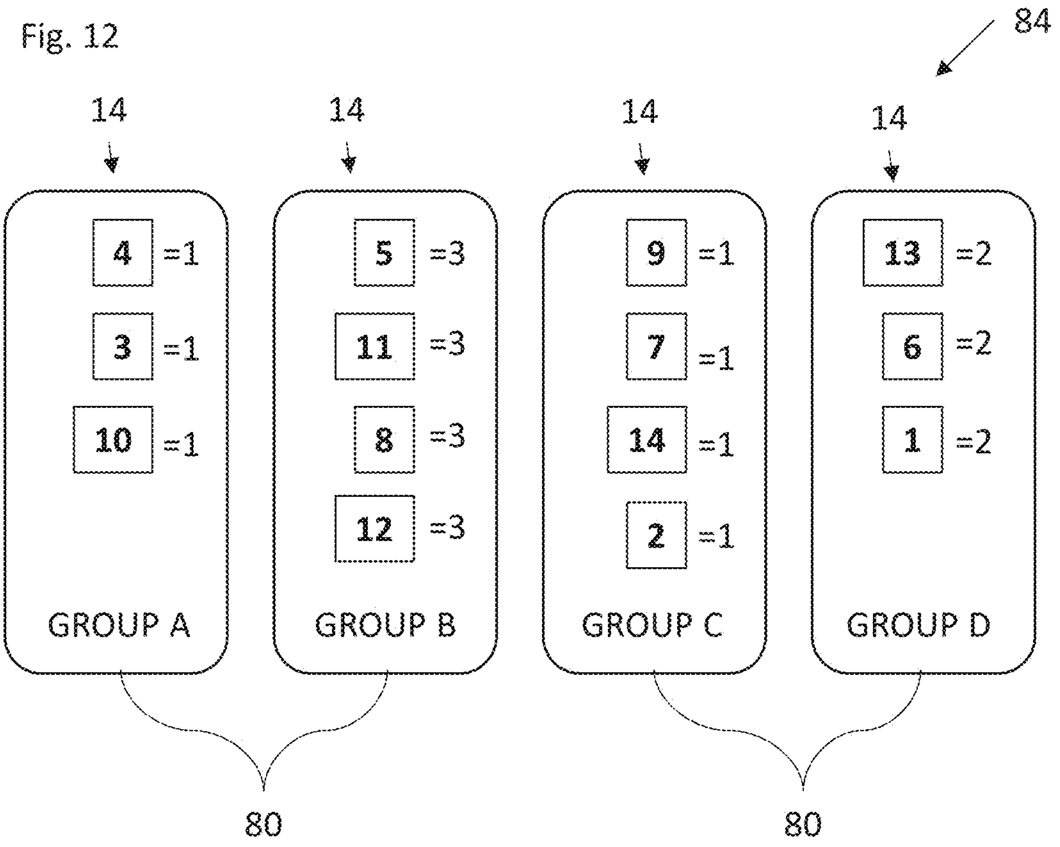

Reference is now made to FIGS. 11 and 12, which are views illustrating example configurations for use in the method of FIG. 2. Reference is also made to FIG. 4. FIG. 11 shows a first example configuration 82, where all the prefetcher engines 14 of group A are assigned aggressiveness level 2, all the prefetcher engines 14 of group B are assigned aggressiveness level 1, all the prefetched engines 14 of group C are assigned aggressiveness level 0, and all the prefetcher engines 14 of group D are assigned aggressiveness level 3. FIG. 12 shows a second example configuration 84, where all the prefetcher engines 14 of group A are assigned aggressiveness level 1, all the prefetcher engines 14 of group B are assigned aggressiveness level 3, all the prefetched engines 14 of group C are assigned aggressiveness level 1, and all the prefetcher engines 14 of group D are assigned aggressiveness level 2.

The processor 12 is configured to provide different prefetcher engine configurations based on the settings to be applied to the prefetcher engines 14 (block 424) such that for each defined group 80, a respective setting is to be applied equally to the prefetcher engines 14 of that group 80, thereby reducing a number of the prefetcher engine configurations available for selection by the machine learning agent 24 (or any suitable machine learning agent). In general, if the number of the prefetcher engines 14 is equal to X, the number of settings (e.g., aggressiveness levels) is equal to Y, and the number of the defined groups 80 is equal to Z, then the number of the prefetcher engine configurations is reduced from $Y^X$ to $Y^Z$.

The reduced set of configurations may be reduced again using any suitable method, for example, using the method described hereinbelow for reducing a set of configurations. In use, the reduced set of configurations may be used by the machine learning agent 24 to select from that reduced set of configurations to control the prefetcher engines 14. In some embodiments, the steps of block 204 and/or block 206 and block 208 of FIG. 2 may be performed as follows. The processor 12 may be configured to execute the machine learning agent 24 to select from different prefetcher engine configurations (e.g., of the reduced set of configurations) to control the prefetcher engines 14, wherein the different prefetcher engine configurations are based on settings to be applied to the prefetcher engines 14 such that groups 80 of the prefetcher engines 14 are defined, and for each defined group 80, a respective setting (e.g., aggressiveness level) is to be applied equally to the prefetcher engines 14 of that group. The processor 12 may be configured to control the prefetcher engines 14 according to the different prefetcher engine configurations selected by the machine learning agent 24 during execution of the software application 20.

Figure 13:
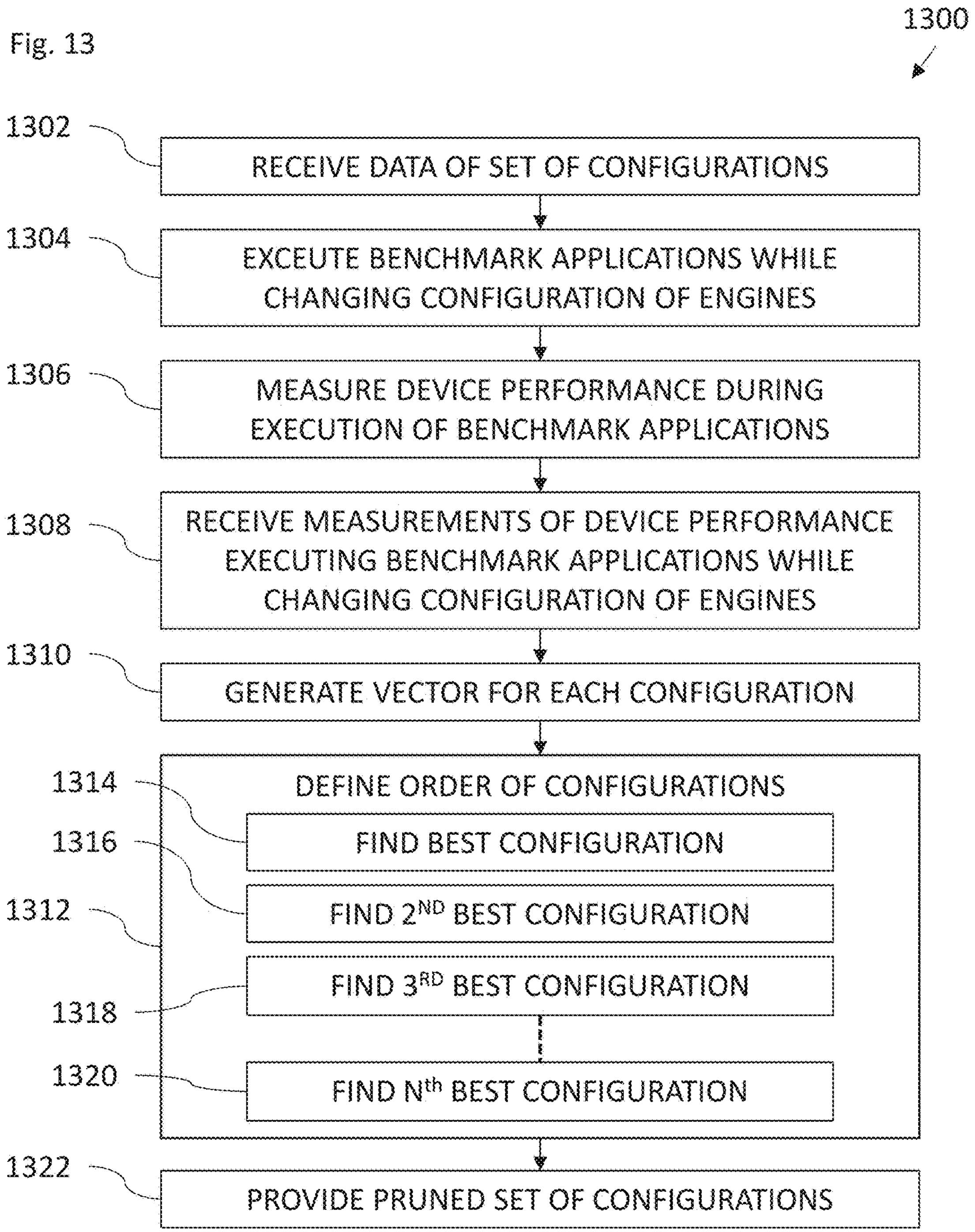
FIG. 13 is a flowchart including steps in another method to reduce a number of configurations for use in the device of FIG. 1.

Reference is now made to FIG. 13, which is a flowchart 1300 including steps in another method to reduce a number of configurations for use in the device 10 of FIG. 1. The processor 12 is configured to receive data of a set of configurations of prefetcher engines 14 (block 1302). The set of configurations may be an already reduced set of configurations, for example, reduced using the method described with reference to FIGS. 4-12 above. In some embodiments, the method described with reference to FIGS. 13-20 may be used to reduce an original set of configurations.

The processor 12 is configured to execute benchmark applications while changing the aggressiveness levels of the prefetcher engines 14 (block 1304) so that each benchmark application is executed with each configuration. For example, if there are 4 groups 80 of prefetcher engines 14 with 4 different levels of aggressiveness to be set for each group 80, then there are 256 possible configurations of the prefetcher engines 14.

The processor 12 is configured to measure the performance of the device 10 during the execution of the benchmark applications (block 1306) for each of the different configurations. For example, if there are 100 benchmark applications and 256 possible configurations, then there will be 100×256 measurements of performance of the device 10 assuming that the device performance may be measured with one metric (e.g., IPC). If device performance is measured with Q metrics, then there will be 100×256×Q measurements of device performance.

The processor 12 is configured to receive measurements of performance of device 10, which executed the benchmark applications while changing the configuration of prefetcher engines 14 selected from the set of configurations of prefetcher engines 14 (block 1308).

The processor 12 is configured to generate vectors, one vector for each configuration of the prefetcher engines 14, indicating device performance per benchmark application (block 1310). Each vector includes elements, with each element indicating device performance while executing a corresponding one of the benchmark applications. For example, a vector for configuration A, may include an element indicating device performance while executing benchmark application 1, and another element indicating device performance while executing benchmark application 2, and so on. For example, if there are 100 benchmark applications, the vector may include 100 elements describing device performance for the 100 corresponding benchmark applications. In some embodiments, the performance may be measured for parts of the benchmark applications (e.g., checkpoints). Therefore, the vector may include elements indicating device performance for corresponding parts of the benchmark applications (e.g., checkpoints). There will be similar vectors for configurations B and C, and so on. If there are 256 configurations, there will be 256 corresponding vectors. The device performance may be expressed as IPC or ln (IPC) or any other suitable performance score, as described in more detail above with reference to FIG. 2.

The processor 12 is configured to define an order of at least some of the configurations based on the measurements (block 1312) (e.g., based on the vectors). The processor 12 is configured to find the best configuration of the configurations based on the measurements (block 1314) (e.g., based on the vectors), as described in more detail with reference to FIG. 14. The processor 12 is configured to find a second-best configuration of the configurations based on the best configuration being found to be the best configuration and based on the measurements (block 1316) (e.g., based on the vectors), as described in more detail with reference to FIGS. 15 and 16. The processor 12 is configured to find a third-best configuration of the configurations based on the best configuration and the second-best configuration being found to the best configuration and the second-best configuration, respectively, and based on the measurements (block 1318) (e.g., based on the vectors), as described in more detail with reference to FIGS. 17 and 18. In general, the processor 12 is configured to find an $N^{th}$ best configuration of the configurations based on the best to N−1 best configurations of the configurations being found to be the best to N−1 best configurations, respectively, and based on the measurements (block 1320) (e.g., based on the vectors), as described in more detail with reference to FIG. 19.

The processor 12 is configured to provide a pruned set of configurations based on the defined order of at least some configurations (block 1322). For example, the processor 12 may find the $10^{th}$ best configurations (or any suitable number of best configurations) from a set of configurations, for example, including 256 configurations, and the $10^{th}$ best configurations form the pruned set of configurations.

Figure 14:
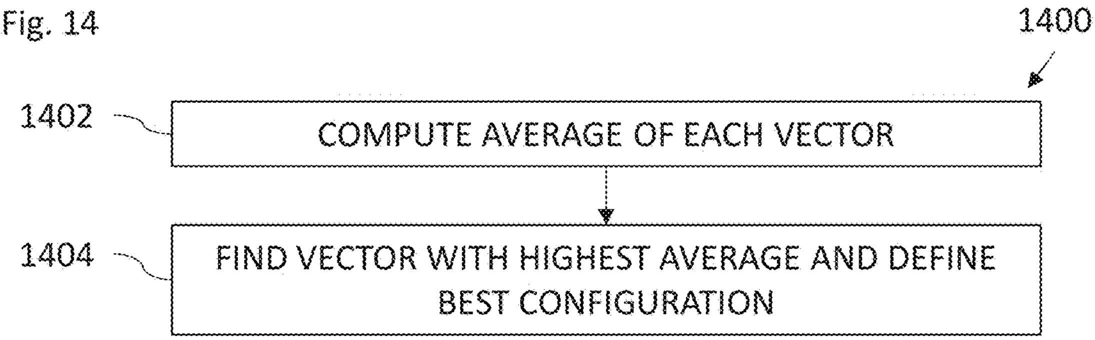
FIG. 14 is a flowchart including sub-steps in the method of FIG. 13 to find a best configuration.

Reference is now made to FIG. 14, which is a flowchart 1400 including sub-steps in the method of FIG. 13 to find the best configuration. As previously mentioned, each vector includes elements, with each element indicating device performance while executing a corresponding one of the benchmark applications (or benchmark application part). The processor 12 is configured to compute averages (e.g., geometric averages over the scenarios, e.g., benchmark applications or parts of the benchmark applications) of the elements of the vectors that indicate the performance of the device 10 (which executed the benchmark applications for respective configurations of the prefetcher engines 14) (block 1402). In other words, the processor 12 is configured to compute an average of the elements of each of the vectors thereby averaging the indications of device performance for each of the benchmark applications or parts of the benchmark applications in each vector. For example, if there are 256 vectors, the processor 12 will compute 256 averages. The processor 12 is configured to: find a vector 86 (FIG. 15) of the vectors having the highest average of the averages computed in the step of block 1402; and define the best configuration as the configuration corresponding to the vector 86 (associated with the highest average) (block 1404).

Figure 15:
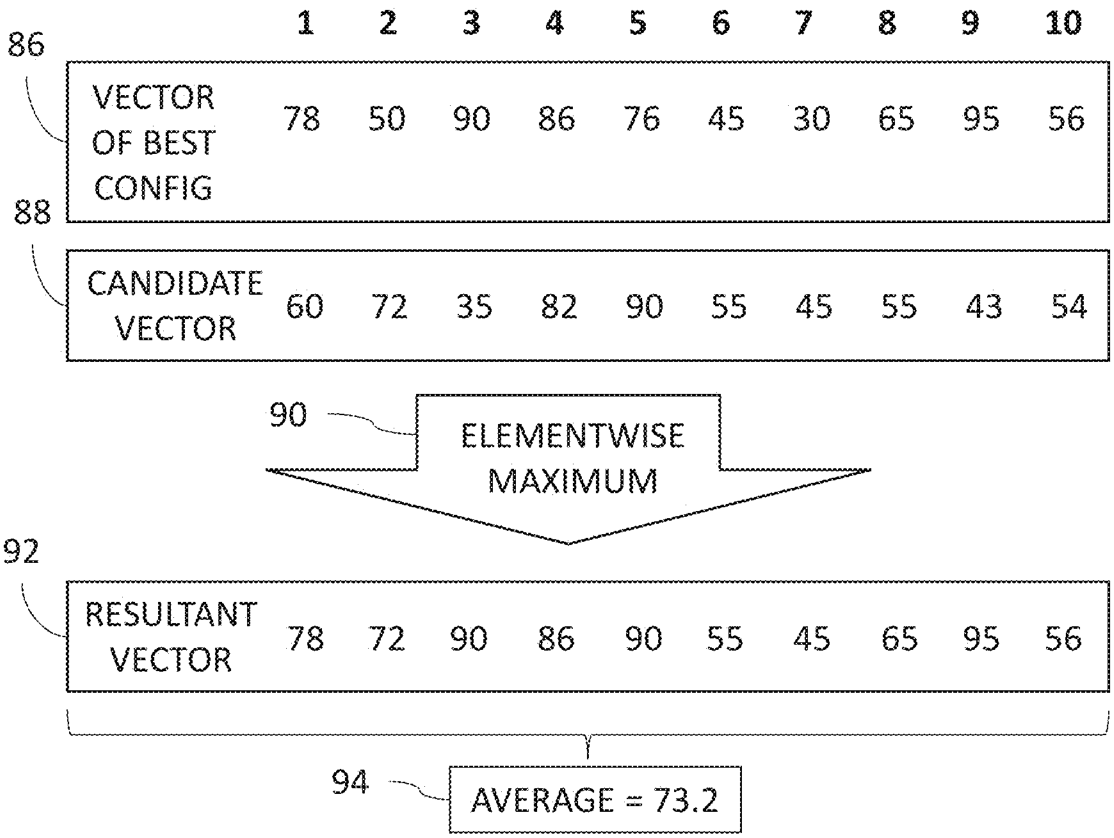
FIG. 15 is a view illustrating vector operations in the method of FIG. 13 to find a second-best configuration.
Figure 16:
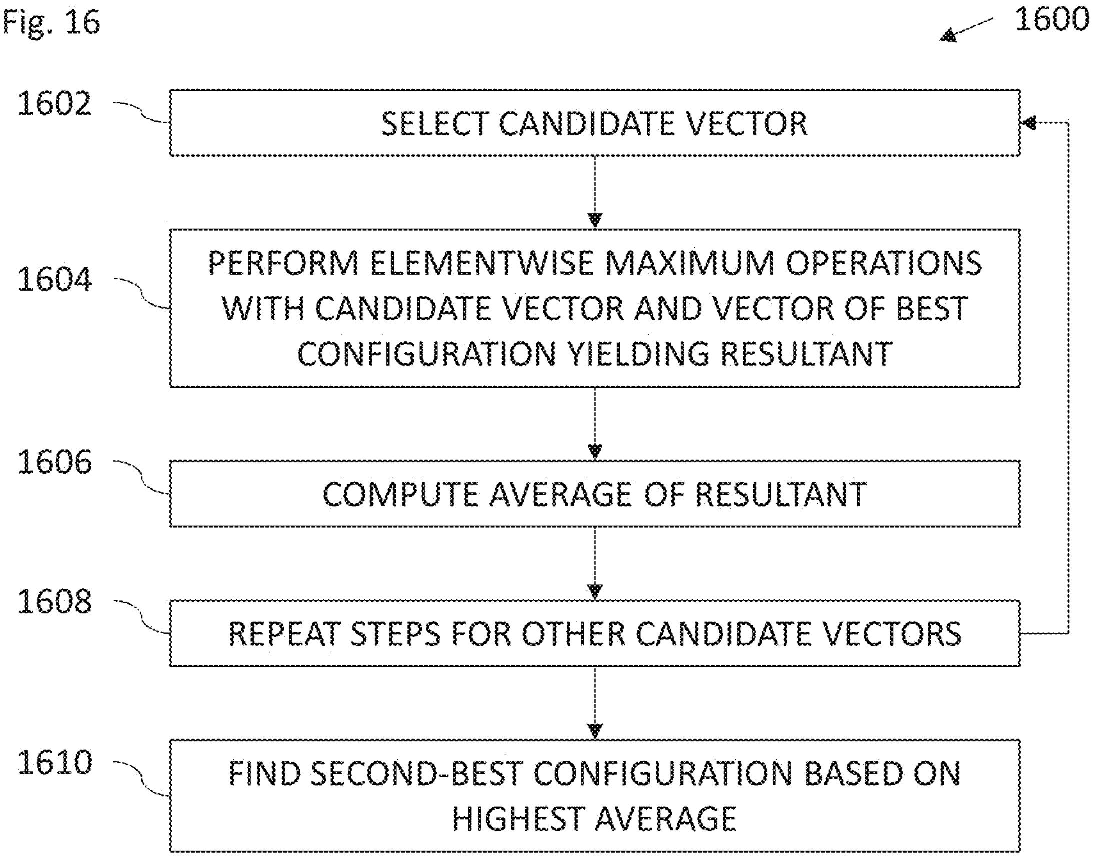
FIG. 16 is a flowchart including sub-steps in the method of FIG. 13 to find a second-best configuration.

Reference is now made to FIGS. 15 and 16. FIG. 15 is a view illustrating vector operations in the method of FIG. 13 to find a second-best configuration. FIG. 16 is a flowchart 1600 including sub-steps in the method of FIG. 13 to find a second-best configuration.

The processor 12 is configured to select a candidate vector 88 of the vectors (block 1602) other than the vector 86 of the best configuration. By way of example, vectors 86 and 88 shown in FIG. 15 each include 10 elements corresponding to the device performance while running 10 corresponding benchmark applications (1-10) for the sake of simplicity. The vectors 86, 88 may include any suitable number of elements corresponding to any suitable number of benchmark applications or parts of the benchmark applications (e.g., checkpoints).

The processor 12 is configured to perform elementwise maximum operations (arrow 90) with the candidate vector 88 and the vector 86 yielding a resultant vector 92 (block 1604). The elementwise maximum operations select the "best" or highest element value for each of the elements from the vectors 86, 88. So for example, element 1 corresponding to benchmark application 1 has an element value of 78 in vector 86 and a value 60 in candidate vector 88, therefore, value 78 is used for element 1 in resultant vector 92. Similarly, element 2 corresponding to benchmark application 2 has an element value of 50 in vector 86 and a value 72 in candidate vector 88, therefore, value 72 is used for element 2 in resultant vector 92, and so on. The processor 12 is configured to compute an average (e.g., geometric average) over all the elements of the resultant vector 92 (block 1606) yielding an average value (ref. num. 94).

The processor 12 is configured to repeat steps of blocks 1602-1606 for other candidate vectors of the vectors yielding multiple resultant vectors 92 with multiple corresponding averages 94 (block 1608). For example, if there are 256 configurations in the configuration set, then the steps are repeated for another 254 candidates vectors 88. The processor 12 is configured to find the second-best configuration corresponding to the candidate vector 88 yielding resultant vector 92 (referred hereinbelow as "the resultant vector 92 of the second-best configuration") having the highest average of the averages 94 (block 1610). In other words, the candidate vector 88 yielding resultant vector 92 having the highest average of the averages 94 is for the second-best configuration.

Figure 17:
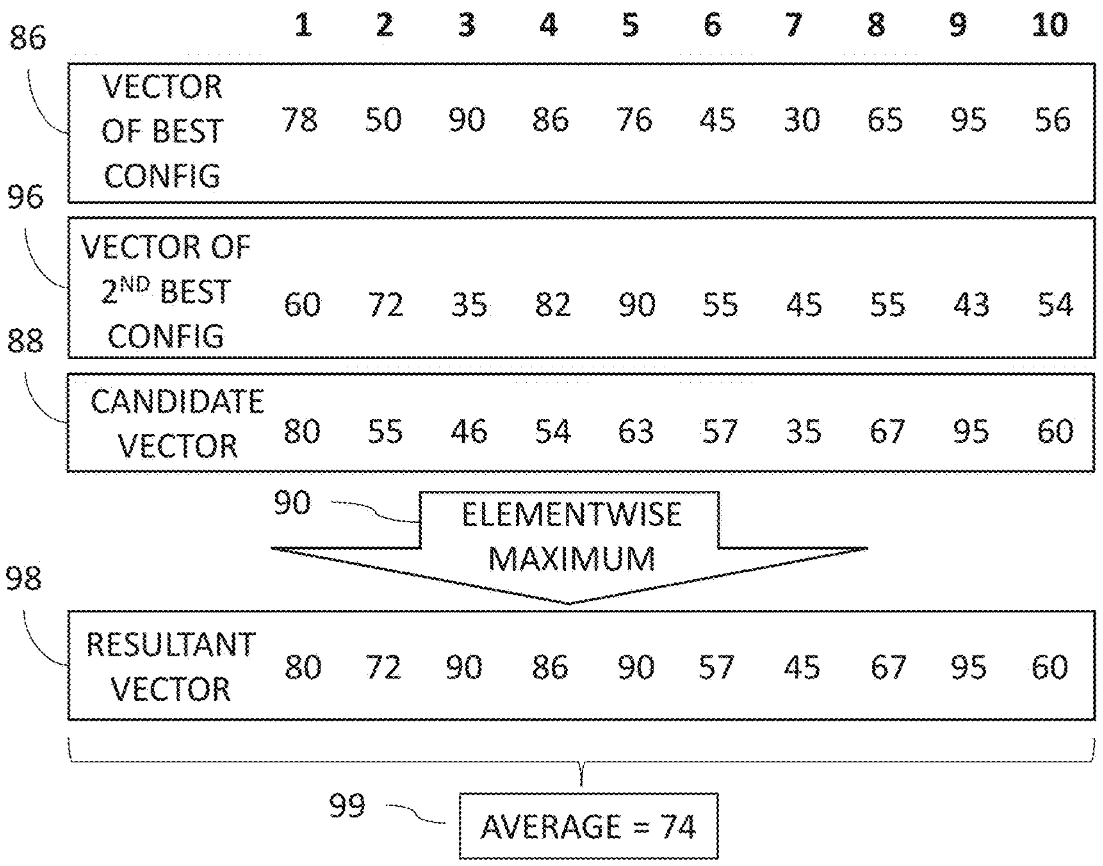
FIG. 17 is a view illustrating vector operations in the method of FIG. 13 to find a third-best configuration.
Figure 18:
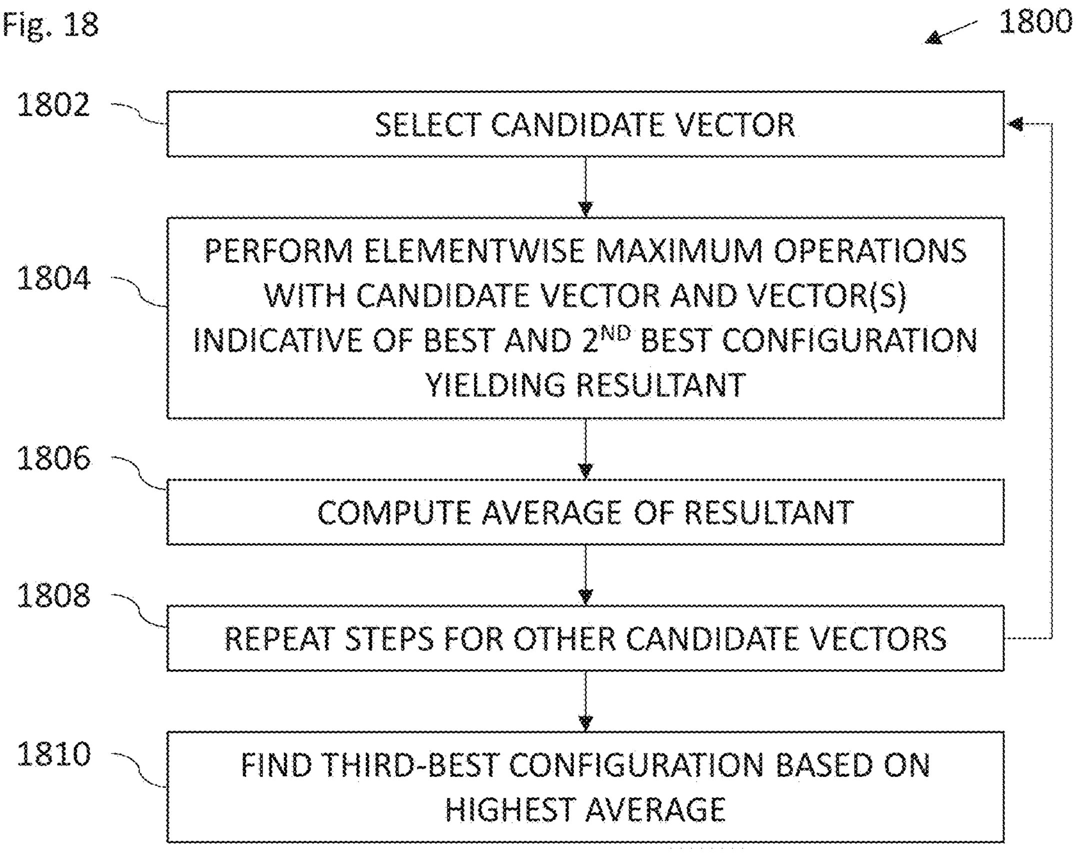
FIG. 18 is a flowchart including sub-steps in the method of FIG. 13 to find a third-best configuration.

Reference is now made to FIGS. 17 and 18. FIG. 17 is a view illustrating vector operations in the method of FIG. 13 to find a third-best configuration. FIG. 18 is a flowchart 1800 including sub-steps in the method of FIG. 13 to find a third-best configuration.

The processor 12 is configured to select a candidate vector 88 of the vectors (block 1802) other than the vector 86 of the best configuration and a vector 96 of the second-best configuration. By way of example, vectors 86, 96 and 88 shown in FIG. 17 each include 10 elements corresponding to the device performance while running 10 corresponding benchmark applications (1-10) for the sake of simplicity. The vectors 86, 96, 88 may include any suitable number of elements corresponding to any suitable number of benchmark applications or parts of the benchmark applications (e.g., checkpoints). The processor 12 is configured to perform elementwise maximum operations (arrow 90) with the candidate vector 88 and vectors 86, 96 (or with the candidate vector 88 and the "resultant vector 92 of the second-best configuration", which is already an element maximum of vectors 86, 96) yielding a resultant vector 98 (block 1804). The elementwise maximum operation selects the "best" or highest element value for each of the elements from the vectors 86, 96, 88. So for example, element 1 corresponding to benchmark application 1 has an element value of 78 in vector 86, a value of 60 in vector 96, and a value of 80 in candidate vector 88, therefore, value 80 is used for element 1 in resultant vector 98. Similarly, element 2 corresponding to benchmark application 2 has an element value of 50 in vector 86, a value of 72 in vector 96, and a value of 55 in candidate vector 88, therefore, value 72 is used for element 2 in resultant vector 98, and so on. The processor 12 is configured to compute an average (e.g., a geometric, or a weighted average) over all the elements of the resultant vector 98 (block 1806) yielding an average value (ref. num. 99).

The averages computed above with reference to FIGS. 13-20 may be any suitable averages, for example, a geometric average or a weighted average, which assigns different weights to different scenarios (e.g., different benchmark applications, or part thereof) in the vectors. The weights are generally assigned according to an estimated significance of each of the scenarios. The weights may be defined by a systems administrator or by any suitable method, for example, the method described with reference to FIG. 21.

The processor 12 is configured to repeat steps of blocks 1802-1806 for other candidate vectors of the vectors yielding multiple resultant vectors 98 with multiple corresponding averages 99 (block 1808). For example, if there are 256 configurations in the configuration set, then the steps are repeated for another 253 candidates vectors 88 yielding 253 resulting vectors and 253 corresponding averages. The processor 12 is configured to find the third-best configuration corresponding to the candidate vector 88 yielding resultant vector 98 having the highest average of the averages 99 (block 1810). In other words, the candidate vector 88 yielding resultant vector 98 having the highest average of the averages 99 is for the third-best configuration.

Figure 19:
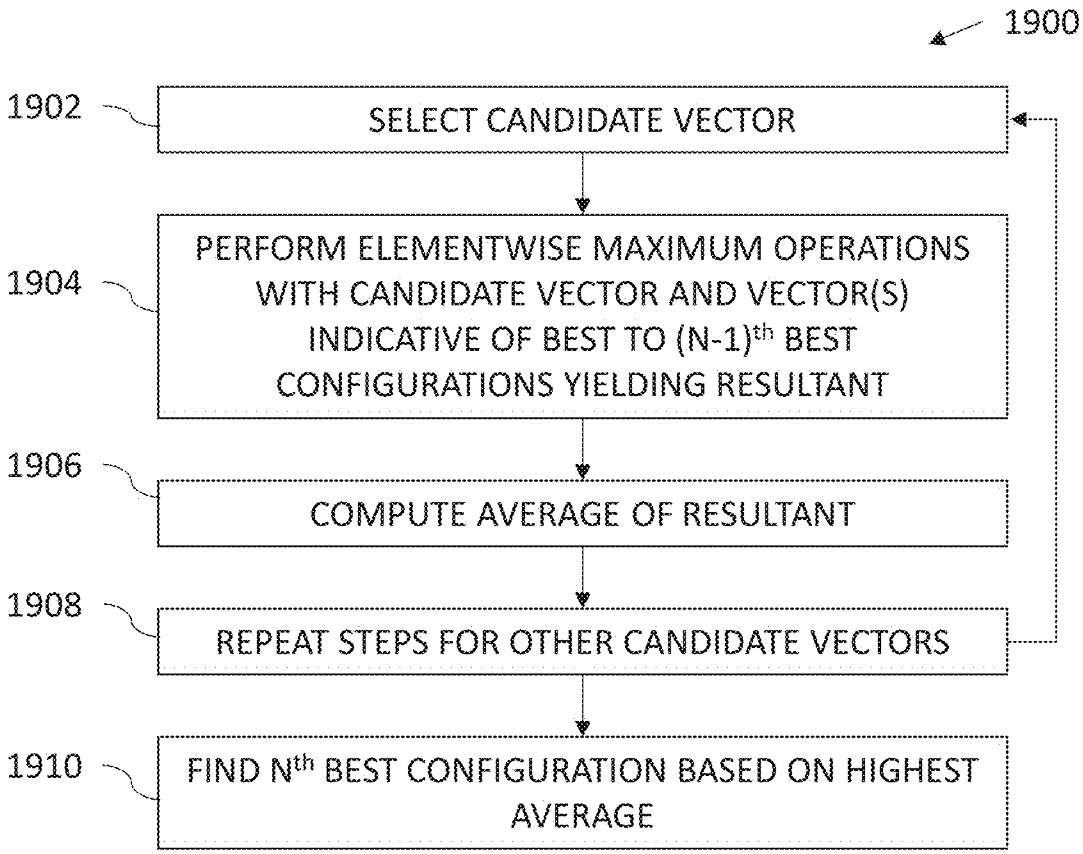
FIG. 19 is a flowchart including sub-steps in the method of FIG. 13 to find an $N^{th}$ best configuration.

Reference is now made to FIG. 19, which is a flowchart 1900 including sub-steps in the method of FIG. 13 to find an $N^{th}$ best configuration. Based on the description above with reference to FIGS. 15-18 describing finding the second and third best configurations, FIG. 19 generally describes finding the $N^{th}$ best configuration. The processor 12 is configured to select a candidate vector of the vectors (block 1902). The processor 12 is configured to perform elementwise maximum operations with the candidate vector and at least one vector (for example, with the vector(s) of (all) the configuration(s) better than the $N^{th}$ configuration, or with a vector representing the elementwise maximum of the vectors of all the configurations better than the $N^{th}$ configuration) indicative of the configurations from the best configuration to an $(N-1)^{th}$ best configuration, yielding a resultant vector (block 1904). The processor 12 is configured to compute an average of the resultant vector (block 1906). The processor 12 is configured to repeat steps of blocks 1902-1906 for other candidate vectors of the vectors yielding multiple resultant vectors with multiple corresponding averages (block 1908). The processor 12 is configured to find the $N^{th}$ best configuration corresponding to the candidate vector yielding the resultant vector having the highest average of the multiple corresponding averages (block 1910).

Figure 20:
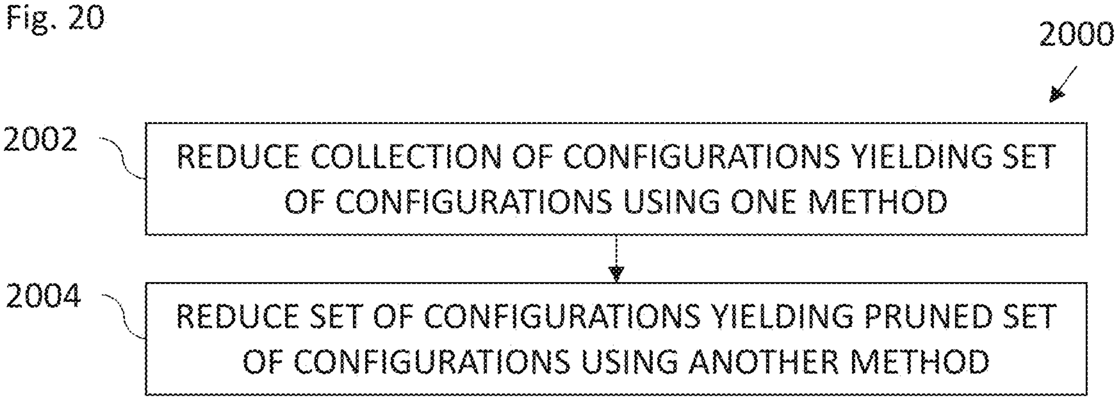
FIG. 20 is a flowchart including steps in a method for use in the device of FIG. 1.

Reference is now made to FIG. 20, which is a flowchart 2000 including steps in a method for use in the device 10 of FIG. 1. The processor 12 is configured to reduce a collection of configurations of the prefetcher engines 14 to yield a reduced set of configurations of the prefetcher engines 14 using a first configuration reduction method, for example, the method described with reference to FIGS. 4-12. The processor 12 is configured to reduce the reduced set of configurations of the prefetcher engines 14 to yield a pruned set of configurations using a second configuration reduction method (different to the first configuration reduction method) for example using the configuration reduction method described with reference to FIG. 13-19.

Reference is now made to FIG. 21, which is a flowchart 2100 including steps in a method for training regression models for use in the device 10 of FIG. 1. As previously mentioned, supervised learning may be used to select prefetcher configurations (e.g., using multiple regression models for corresponding prefetcher engine configurations), as described in more detail below.

By way of overview, machine learning training data is used to train configuration specific machine learning regression models to provide configuration specific device performance predictions based on given device hardware states of the device 10. For example, a regression model is trained for prefetcher configuration A to provide a device performance prediction (i.e., predict how the device 10 will behave) if the prefetcher engines 14 are set according to configuration A based on a given hardware state (e.g., represented by counter values of counters 28 (FIG. 1) of device 10), a regression model is trained for prefetcher configuration B to provide a device performance prediction (i.e., predict how the device 10 will behave) if the prefetcher engines 14 are set according to configuration B based on a given hardware state (e.g., represented by counter values), and so on for all the different configurations. In some embodiments, each regression module is also trained to provide a prediction based on the given hardware state and the configuration used to control the prefetcher engines in the previous processing interval. The device performance prediction may be an indication of executed instruction per cycle (IPC) or any suitable metric or any combination of suitable metrics. The hardware state may be indicated by central processing unit (CPU) statistical counters such as performance counters available in ARM cores.

In use, prior to each processing interval, the hardware state of the device 10 is retrieved, and the retrieved hardware state (and optionally the previous configuration used to control the prefetcher engines) is input into each of the trained regression models yielding a prediction for each trained regression model. For example, the retrieved hardware state is input into the trained regression model for prefetcher engine configuration A, which provides a prediction, the same retrieved hardware state is input into the trained regression model for prefetcher engine configuration B, which provides a prediction, and so on. The regression model yielding the best (e.g., the highest or lowest depending upon whether the performance indicator is maximized or minimized, respectively) prediction indicates the prefetcher engine configuration that is used in the next processing interval to control the prefetcher engines. In this manner, the hardware state (and optionally the configuration used to control the prefetcher engines) of the previous processing interval is used to find the prefetcher engine configuration to use in the next processing interval.

The training of the regression models is now described in more detail below.

The processor 12 is configured to execute benchmark applications with different configurations of the prefetcher engines 14 (block 2102). For example, the processor 12 is configured to execute the benchmark applications with configuration A, then execute the same benchmark applications with configuration B, and so on. The processor 12 is configured to record the hardware states during execution of the benchmark applications (e.g., record the hardware state in each processing interval) (block 2104), and perform measurements of device performance (e.g., in each processing interval) (block 2106). In some embodiments, the processor 12 is configured to execute each benchmark application (or part thereof, e.g., each checkpoint) with each prefetcher engine configuration (while the prefetcher engines 14 are set according to configuration A, B and so on) and perform measurements of device performance (e.g., IPC, memory transactions per cycle, power cost per memory transaction, average core frequency, average core power, and temperature) and capture hardware states (e.g., counter values of the counters 28) for each processing interval (while the prefetcher engines 14 are set according to configuration A, B and so on).

The processor 12 is configured to compute each of a plurality of label score (block 2108) based on any one or more of the following: executed instructions per cycle; memory transactions per cycle; power cost per memory transaction; average core frequency; average core power; power budget; and measured temperature. The label scores may be computed according to the score described above with reference to FIG. 2.

The processor 12 is configured to receive (e.g., from memory or cache or from another device) machine learning training data including the label scores based on the measurements of device performance during execution of the benchmark applications for different prefetcher engine configurations, and corresponding device hardware states (block 2110), where each score corresponds with a hardware state, as will be described in more detail with reference to FIG. 23. In some embodiments, the machine learning training data includes the label scores, the corresponding device hardware states, and corresponding previous prefetcher engine configurations, as will be described in more detail with reference to FIG. 23. In some embodiments, the hardware states are at least partially indicated by counter values, e.g., of the counters 28.

The regression models are trained to map the captured hardware states to labels (e.g., scores or measurements of device performance). The processor 12 is configured to train the configuration specific machine learning regression models based on the received machine learning training data to provide corresponding configuration specific device performance predictions based on device hardware states (block 2112) and optionally previous prefetcher engine configurations, as described in more detail with reference to FIG. 23. For example, a regression model is trained for prefetcher configuration A to provide a device performance prediction if the prefetcher engines 14 are set according to configuration A based on a given hardware state of device 10, a regression model is trained for prefetcher configuration B to provide a device performance prediction if the prefetcher engines 14 are set according to configuration B based on a given hardware state, and so on for all the different configurations. For example, the regression model for prefetcher A may be trained based on a data set including pairs each indicating hardware state and label score (and optionally the configuration used in the previous processing interval) for corresponding different scenarios (e.g., different benchmark application or parts thereof) when the prefetcher engines 14 are set according to configuration A. The regression models may be implemented using any suitable model type such as linear models, decision trees, or neural networks, by way of example.

The processor is configured to train the configuration specific machine learning regression models using corresponding configuration specific cost (or loss) functions (based on optimizing, e.g., minimizing or maximizing the cost functions) based on data indicative of different scenarios while running the benchmark applications. In some embodiments, the data of the different scenarios is weighted in the cost functions, as described in more detail below.

For a regression model, a loss function may be defined as the square error (or mean square error) between the prediction (i.e., the output of the regression model based on a given input, e.g., the hardware state of device 10) and the label (e.g., score computed from the measured device performance). Since the supervised machine learning model has limited resources, it may be more efficient to focus on scenarios which are more important. For example, accuracy may be less important for configurations (referred to as policies below) that are far from the optimal policy for a given scenario. Therefore, providing weights to the different scenarios may make the supervised learning training more efficient.

An example loss function for a given regression model may be given by:

$$\sum_i Wi(Pi - Li)^2,$$

where Pi is the prediction for scenario i, Li is the label for scenario i, and Wi is the weight for scenario i. The loss function is summed over all scenarios i (e.g., checkpoints or applications) in the dataset.

Taking a given scenario (e.g., one benchmark application or a part thereof, e.g., checkpoint), there is a label for each of the policies when the scenario is executed when the prefetcher engines 14 are configured according to each of the policies. The policy with the best reward (e.g., highest score) for that scenario is called the best policy, and the one with the second-best reward is called the next challenger. For a policy which is not the best policy, that policy is more important when the prediction of the non-best policy is close to the prediction of the best policy and not as important if far from the best policy. For the best policy, if the prediction is far from the next challenger, the prediction is generally unimportant as anyway the best policy will be selected. If the prediction is close to the challenger, there is a possibility that due to an error the challenger will be chosen instead of the best policy.

The following factors are assumed regarding computing the weights of the scenarios in the loss function. The weighting drops as a function of the distance of the result from a reference: (a) for the best policy the distance is from the next challenger, and (b) for any other policy the distance is from the best policy.

On top of the above heuristic, two measures are taken to protect the machine learning from abnormal behavior on edge cases. A worst-case is taken between the label and the actual prediction. The significance weighting does not drop on inversion, i.e., when the best policy has a lower value than another policy.

The following terms are defined.

$L_i^k$ is the label of policy k for checkpoint i.

$P_i^k$ is the prediction of policy k for checkpoint i.

$B_i = \text{argmax}_k(L_i^k)$ and is the best policy for checkpoint i.

$L_i^b$ is the label of the best policy for checkpoint i.

$P_i^b$ is the prediction of the best policy for checkpoint i.

$CL_i = \text{argmax}_{k \neq b}(L_i^k)$ and is the challenger policy for checkpoint i.

$L_i^{cl}$ is the label of the challenger policy for checkpoint i.

$CP_i = \text{argmax}_k g\ (P_i^k)$ and is the predicted challenger for checkpoint i. It should be noted that $CP_i$ may be different from $CL_i$.

$P_i^{cp}$ is the prediction of the predicted challenger for checkpoint i.

$$GB_i = \min(L_i^b, P_i^b).$$

$$GC_i = \max(L_i^{cl}, P_i^{cp}).$$

$$G_i^k = \max(L_i^k, P_i^k).$$

$W_i^k$ is a significance-weighting of policy k for checkpoint i, defined below.

$W_i^b$ is a significance-weighting of the best policy for checkpoint i, defined below.

α is a hyper parameter and may have any value. One suggested starting value is α=0.01.

$$W_i^b = \begin{cases} \dfrac{\alpha^2}{\alpha^2 + (GB_i - GC_i)^2} & GB_i > GC_i \\ 1 & GB_i \leq GC_i \end{cases}$$

The above formula shows that if $GB_i$ and $GC_i$ are far from each other, the weight is low. If $GB_i$ and $GC_i$ are close together, the weight is close to 1.

$$W_i^{k \neq b} = \begin{cases} \frac{\alpha^2}{\alpha^2 + (GB_i - G_i^k)^2} & GB_i > G_i^k \\ 1 & GB_i \leq G_i^k \end{cases}$$

The above formula provides the weight of a non-best policy. If $GB_i$ is close to $G_i^k$, the weight is close to 1. If $GB_i$ is far from $G_i^k$, the weight is lower.

Therefore, in some embodiments, the processor 12 is configured to compute a weight of a best configuration of the different prefetcher engine configurations for a given scenario i (block 2114), such that the computed weight is a function of a comparison between $GB_i$ and GC, and wherein $GB_i$ is a function of a label and/or a prediction of the best configuration for the given scenario i, and $GC_i$ is a function of a label and/or a prediction of a second best configuration for the given scenario i. The weights of the best configurations for each of the different scenarios i are computed in a similar manner.

In some embodiments, the processor 12 is to compute a weight of a non-best configuration of the different prefetcher engine configurations for a given scenario i (block 2116), such that the weight of the non-best configuration is a function of a comparison between $GB_i$ and $G_i^k$, and wherein $G_i^k$ is a function of a label and/or a prediction of the non-best configuration for the given scenario. The weights of the non-best configurations for each of the different scenarios i are computed in a similar manner. In some embodiments, the sum of weights for a given policy may be required to equal 1, and the weights may need to be normalized so that the sum of the weights for a given policy are equal to 1.

It will be noted that the weights are a function of the prediction of the models, but the weights are also used to train the predictions of the regression models. Therefore, for any one of the regression models, the processor 12 is configured to compute the weights based on a default value of the prediction, build the cost function based on the computed weights (block 2118), compute predictions based on the scenarios and the cost function (block 2120), and perform an iteration (block 2122) of computing the weights based on the new predictions, updating the cost function with the updated weights, and computing the predictions based on the scenarios and the updated cost function. The iterations may be performed until a steady state is approached. Suggested default values are $P_i^b=\infty$ and $P_i^{k/b}=-\infty$.

Therefore, the processor 12 is configured to perform multiple iterations of computing the weights of the best configurations and the non-best configurations for the different scenarios, and the configuration specific device performance predictions used as input to the computation of the weights.

In some embodiments each configuration specific machine learning regression model includes different sub-models for different previous prefetcher engine configurations of the previous time window. Therefore, the processor 12 is configured to train the different sub-models for previous prefetcher engine configurations (block 2124). For example, the regression model for configuration A may include a sub-model for configuration A (termed "sub-model A-A"), a sub-model for configuration B (termed sub-model A-B, and so on. Similarly, the regression model for configuration D may include a sub-model for configuration A (termed "sub-model D-A"), a sub-model for configuration B (termed sub-model D-B, and so on. For example, the sub-model D-B is a regression model trained to provide a device performance prediction if the prefetcher engines are to be set according to configuration D based on a given hardware state (e.g., represented by counter values) and the configuration of the previous processing interval is configuration B. Therefore, if there are N configurations, there may be $N^2$ sub-models.

In use, for a given previous prefetcher engine configuration, a respective one of the sub-models of each of the configuration specific machine learning regression models is selected to provide a prediction based on the device hardware state and the given previous prefetcher engine configuration. In other words, in use, the relevant sub-models are selected and applied to provide predictions. The best prediction (e.g., highest, or lowest) indicates the configuration to be used in the next processing interval. For example, if the configuration used in the previous processing interval is configuration G, then sub-model A-G, sub-model B-G, sub-model C-G, and so on, are selected and applied to provide predictions based on the given hardware state of the previous processing interval. If sub-model B-G provides the best prediction, then configuration B is selected to configure the prefetcher engines 14 in the next processing interval.

In some embodiments, instead of having N regression models being trained to provide predictions for N configurations, a single classification engine may be trained to predict the best configuration for the next processing interval. In other embodiments, instead of having a single classification engine, N classification engines (e.g., N regression models or any other suitable classification engines) may be trained to provide predictions for N corresponding previous prefetcher engine configurations as input to the respective classification engines. For example, classification engine A may provide a prediction of the best configuration for the next processing interval based on the previous processing interval being configuration A, and classification engine B may provide a prediction of the best configuration for the next processing interval based on the previous processing interval being configuration B, and so on.

The size of the time window of each processing interval is selected carefully. Shorter time windows allow for quicker reactions to changes in hardware state. However, if the time window is too small, then the statistics captured may be too short term to be stable enough to provide a good estimate of the configuration for the next processing interval. Any suitable time interval may be used, for example, 10s of milliseconds. An application may be divided into checkpoints which represent large sequences of instructions which may be repeatedly run while the application is executed. The checkpoint size (or average checkpoint size) may be indicative of an optimal time window for a given application. In other words, the time window may be the same order of magnitude as the average checkpoint size.

Each checkpoint may have a weight based on the number of times that checkpoint reoccurs in the application. The checkpoint weights may also be used to compute the average checkpoint size. Checkpoint weights may be used in the training process to give the model more focus on samples with higher frequency.

Figure 22:
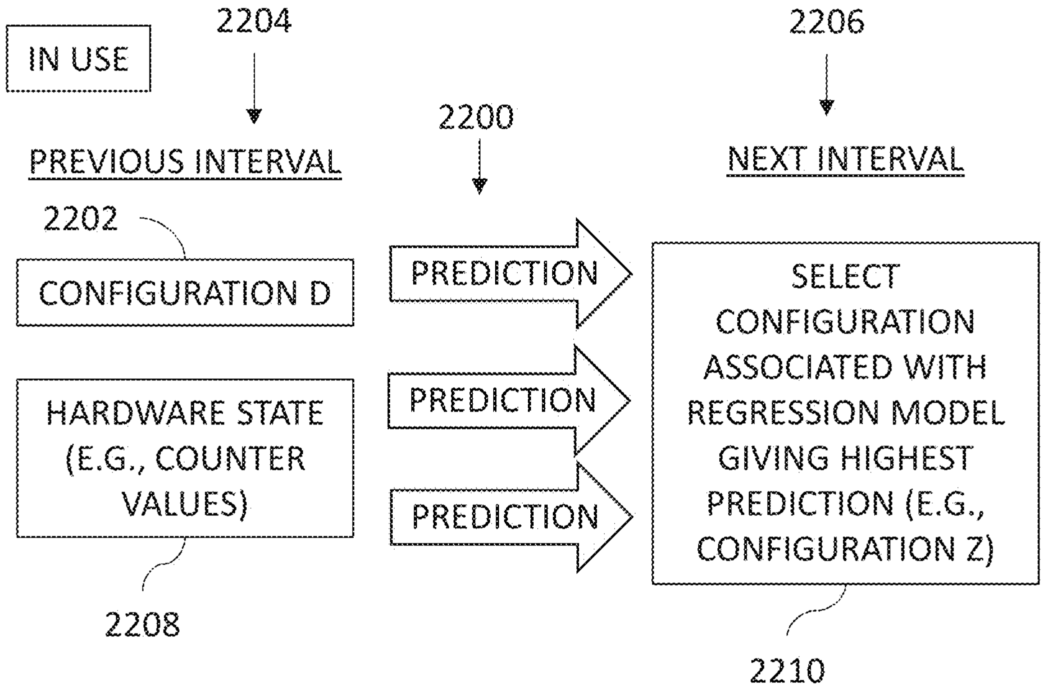
FIG. 22 is a view of an example showing use of trained regression models in the device of FIG. 1.

Reference is now made to FIG. 22, which is a view of an example showing use of trained regression models 2200 (only 3 shown for the sake of simplicity) in the device 10 of FIG. 1. FIG. 22 shows that the prefetcher engines 14 were controlled using configuration D (block 2202) in a previous processing interval 2204. FIG. 22 also shows a hardware state 2208 in (or at the end of) the previous processing interval 2204. The hardware state and optionally configuration D of the previous processing interval 2204 are used to predict the configuration to be used for a next processing interval 2206. The trained regression models 2200 are applied with the hardware state and optionally configuration D of the previous processing interval 2204 as input to yield predictions. The trained regression model 2200 yielding the best (e.g., the highest or lowest) prediction indicates the configuration to be selected in the next processing interval 2206 (block 2210).

Figure 23:
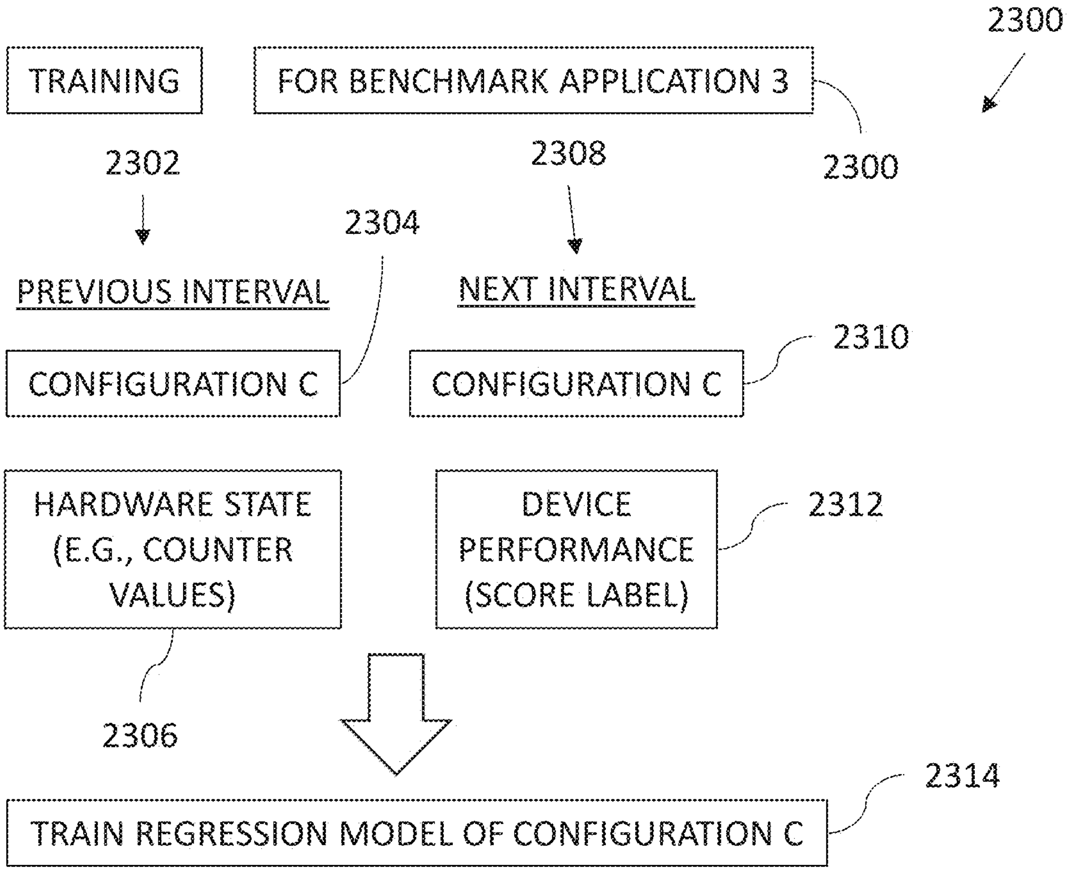
FIG. 23 is a view of an example showing training regression models in the device of FIG. 1.

Reference is now made to FIG. 23, which is a view of an example showing training a regression model 2314 in the device 10 of FIG. 1. In the example of FIG. 23 the training is performed while benchmark application 3 is being executed (block 2300). In a previous processing interval 2302, configuration C (block 2304) is applied to the prefetcher engines 14, and a hardware state 2306 is captured (e.g., at the end of previous processing interval 2302). In a next processing interval 2308, configuration C (block 2310) is also applied to the prefetcher engines 14, and device performance 2312 is measured. In general, the same configuration is applied to the prefetcher engines 14 while all the benchmark applications are run, and measurements are taken, and hardware states are captured per processing interval. The same is repeated for each configuration, yielding a dataset for each configuration. For example, the prefetcher engines 14 may be set to configuration C while all the benchmark applications are run, and measurements are taken, and hardware states are captured per processing interval, yielding a dataset for configuration C, and so on.

The hardware state 2306 from the previous processing interval 2302 and the device performance 2312 measured in the next processing interval 2308 may be used (along with similar data from running the benchmark applications with configuration C) to train regression model 2314 which is used to provide a prediction for configuration C based on a hardware state as input.

When the regression model 2314 is trained based on the configuration used in the previous processing interval as input, more data is used. For example, if the regression model 2314 for configuration C is to be trained based on the previous processing interval being configuration D, then the data set for configuration C and D are used as described below. The corresponding hardware states found in dataset for configuration D (from running the benchmark applications while the prefetcher engines 14 are set to configuration D) are used with the device performance 2312 found in dataset for configuration C (from running the benchmark applications while the prefetcher engines 14 are set to configuration C).

In some embodiments, the corresponding hardware states from the dataset of configuration D are used with the device performance 2312 the dataset of configuration C to train a regression sub-model (e.g., sub-model C-D) which is used to provide a prediction for configuration C when the configuration of the previous processing interval 2302 is equal to configuration D.

Figure 24:
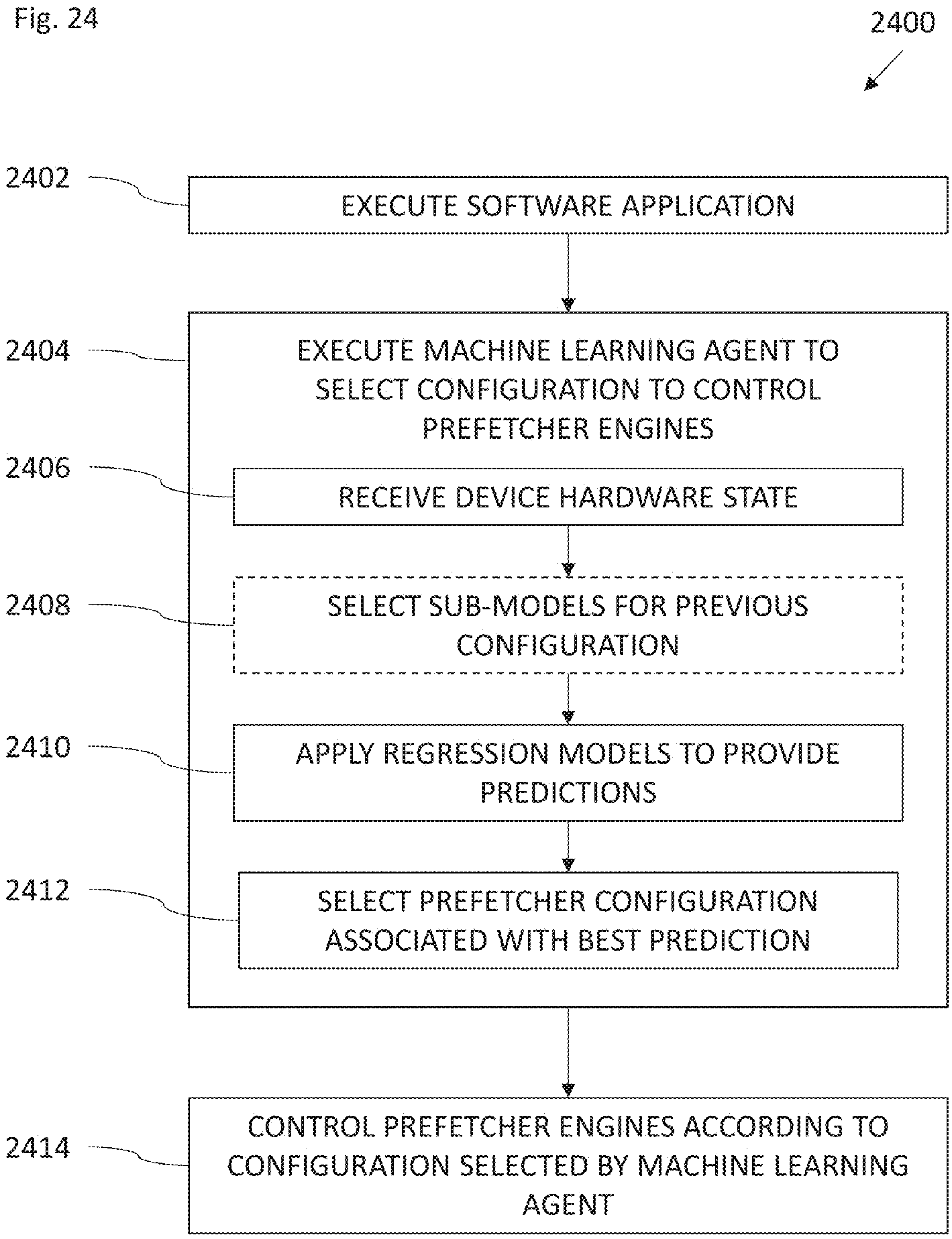
FIG. 24 is a flowchart including steps in a method for using trained regression models in the device of FIG. 1.

Reference is now made to FIG. 24, which is a flowchart 2400 including steps in a method for using trained regression models in the device 10 of FIG. 1. Reference is also made to FIG. 1. The processor 12 is configured to execute the software application 20 (block 2402). The processor 12 is configured to execute the machine learning agent 24 to select from different prefetcher engine configurations to control the prefetcher engines 14 (block 2404) while the software application 20 is being executed. In some embodiments, the machine learning agent 24 is configured to select from a pruned set of prefetcher engine configurations, pruned using any suitable method or methods, for example, using one or more of the methods described above with reference to FIGS. 4 to 20.

The machine learning agent 24 is configured to receive a device hardware state (e.g., (at the end) of the previous processing interval) (block 2406). When sub-models are used the machine learning agent is configured to select, for the previous prefetcher engine configuration (i.e., the prefetcher engine configuration used in the previous processing interval), a respective sub-model of each configuration specific machine learning regression model to provide a prediction based on the received device hardware state and the previous prefetcher engine configuration (block 2408). For example, if the configuration used in the previous processing interval is configuration G, then sub-model A-G, sub-model B-G, sub-model C-G, and so on, are selected.

When sub-models are not used, the machine learning agent 24 is configured to apply the configuration specific machine learning regression models to provide corresponding configuration specific performance predictions based on the received device hardware state and optionally based on the prefetcher engine configuration of the prefetcher engines 14 (block 2410). When sub-models are used, the machine learning agent 24 is configured to apply, for the previous prefetcher engine configuration, the selected sub-models (selected in the step of block 2408) to provide a prediction based on the received device hardware state and the given previous prefetcher engine configuration.

The machine learning agent 24 is configured to select the prefetcher configuration to control the prefetcher engines 14 in the next processing interval based on the best prediction (e.g., highest, or lowest prediction) of the corresponding configuration specific performance predictions (block 2412). The processor 12 is configured to control the prefetcher engines 14 according to the different prefetcher engine configurations selected by the machine learning agent 24 during execution of the software application. The steps of blocks 2406 to 2414 are repeated for each processing interval.

Example 1: A system, comprising: a processor to: receive machine learning training data including label scores based on measurements of device performance during execution of benchmark applications for different prefetcher engine configurations, and corresponding device hardware states and corresponding previous prefetcher engine configurations; and train a machine learning agent based on the received machine learning training data to provide device performance predictions based on given device hardware states and given previous prefetcher engine configurations; and a memory to store data used by the processor.

Example 2: The system according to example 1, wherein the corresponding hardware states and the given device hardware states are at least partially indicated by counter values.

Example 3: The system according to example 1, wherein the processor is to compute each of the label scores based on any one or more of the following: executed instructions per cycle; memory transactions per cycle; power cost per memory transaction; average core frequency; average core power; power budget; and measured temperature.

Example 4: The system according to example 1, wherein the machine learning agent includes different sub-models for respective ones of the given previous prefetcher engine configurations so that for a given previous prefetcher engine configuration a respective one of the sub-models is selected to provide a prediction based on one of the given device hardware states and the given previous prefetcher engine configuration.

Example 5: A system, comprising: prefetcher engines to: predict next memory access addresses of a memory from which to load data to a cache during execution of a software application; and load the data from the predicted next memory access addresses to the cache during execution of the software application; and a processor to: execute the software application; execute a machine learning agent to select from different prefetcher engine configurations to control the prefetcher engines based on received device hardware states and previous prefetcher engine configurations of the prefetcher engines; and control the prefetcher engines according to the different prefetcher engine configurations selected by the machine learning agent during execution of the software application.

Example 6: The system according to example 5, wherein each of the prefetcher engines is to selectively provide different levels of aggressiveness, the different configurations of the prefetcher engines providing different aggressiveness configurations of the prefetcher engines.

Example 7: The system according to example 5, wherein the device hardware states are at least partially indicated by counter values.

Example 8: The system according to example 5, wherein: the machine learning agent includes different sub-models for respective ones of the given previous prefetcher engine configurations; and the machine learning agent is to select and apply, for a given previous prefetcher engine configuration, a respective one of the sub-models to provide a prediction based on one of the received device hardware states and the given previous prefetcher engine configuration.

Example 9: A system, comprising: a processor to: receive machine learning training data including label scores based on measurements of device performance during execution of benchmark applications for different policies; and train policy specific machine learning regression models to provide corresponding policy specific device performance predictions based on: the received machine learning training data; and policy specific cost functions based on data indicative of different scenarios while running the benchmark applications, the data of the different scenarios being weighted in the cost functions; and a memory to store data used by the processor.

Example 10: The system according to example 9, wherein the processor is to compute a weight of a best policy of the different policies for a given scenario of the scenarios, such that the computed weight decreases as the difference between GB and GC increases, and wherein GB is a minimum of a label and a prediction of the best policy for the given scenario and GC is a maximum of a label and a prediction of a second best policy for the given scenario.

Example 11: The system according to example 10, wherein the processor is to compute a weight of a non-best policy of the different policies for the given scenario, such that the weight of the non-best policy decreases as the difference between GB and GK increases, and wherein GK is a maximum of a label and a prediction of the non-best policy for the given scenario.

Example 12: The system according to example 11, wherein the processor is to perform multiple iterations of computing weights of best policies and non-best policies for the different scenarios, and the policy specific device performance predictions used as input to the computation of the weights.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A method, comprising:

finding an impact on performance of a device from changing settings of preprocessor engines applied to benchmark applications being executed by the device based on measured performance of the device;

defining groups of the preprocessor engines responsively to the impact on the performance of the device from changing the settings of the preprocessor engines; and providing different preprocessor engine configurations based on the settings to control the preprocessor engines such that for each one of the defined groups a respective setting is to be applied equally to the preprocessor engines of the one group, thereby reducing a number of the preprocessor engine configurations available for selection by a machine learning agent.

2. The method according to claim 1, wherein the preprocessor engines are prefetcher engines, the settings are aggressiveness levels, and the preprocessor engine configurations are prefetcher engine configurations.

3. The method according to claim 1, further comprising:

executing the benchmark applications while changing the settings of the preprocessor engines; and measuring the performance of the device during the execution of the benchmark applications, wherein the finding includes finding the impact on performance based on the measured performance of the device.

4. The method according to claim 1, wherein:

a number of the preprocessor engines is equal to X;

a number of the settings is equal to Y;

a number of the defined groups is equal to Z; and the number of the preprocessor engine configurations is reduced from YX to YZ.

5. The method according to claim 1, further comprising computing statistical measures based on vectors for corresponding ones of the prefetchers engines describing the impact on the performance of the device of changing settings of the preprocessor engines applied to benchmark applications being executed by the device, wherein the defining includes defining the groups based on the computed statistical measures.

6. The method according to claim 5, wherein:

the computing includes:

computing a measure of dispersion for each of the vectors; and computing measures of similarity between pairs of the vectors; and the defining includes defining the groups based on the computed measure of dispersion of at least some of the vectors and the computed measures of similarity between at least some of the pairs of vectors.

7. The method according to claim 6, wherein the measure of dispersion is a variance or a standard deviation.

8. The method according to claim 6, wherein each of the measures of similarity is a cosine similarity or correlation.

9. The method according to claim 6, further comprising selecting pivotal members of the groups such that a different one of the preprocessor engines is selected as a pivotal member of each of the groups based on the measure of dispersion of corresponding ones of the vectors.

10. The method according to claim 9, wherein the selecting includes selecting the pivotal members based on highest measures of deviation of corresponding ones of the vectors.

11. The method according to claim 9, wherein the selecting includes selecting the pivotal members based on the measure of dispersion of corresponding ones of the vectors while minimizing the measures of similarity between the corresponding ones of the vectors of the pivotal members.

12. The method according to claim 9, further comprising, for each one of the groups, adding other ones of the preprocessor engines to the one group based on the measures of similarity of ones of the vectors with the vector of the pivotal member of the one group.

13. The method according to claim 9, further comprising, for each one of the groups, adding at least one of the preprocessor engines to the one group based on at least one of the measures of similarity of at least one of the vectors with at least one of the vectors of at least one existing member of the one group.

14. A system, comprising:

a processor to:

find an impact on performance of a device from changing settings of preprocessor engines applied to benchmark applications being executed by the device based on measured performance of the device;

define groups of the preprocessor engines responsively to the impact on the performance of the device from changing the settings of the preprocessor engines; and provide different preprocessor engine configurations based on the settings to control the preprocessor engines such that for each one of the defined groups a respective setting is to be applied equally to the preprocessor engines of the one group, thereby reducing a number of the preprocessor engine configurations available for selection by a machine learning agent; and a memory to store data used by the processor.

15. The system according to claim 14, wherein the preprocessor engines are prefetcher engines, the settings are aggressiveness levels, and the preprocessor engine configurations are prefetcher engine configurations.

16. The system according to claim 14, further comprising the preprocessor engines, wherein the processor is to:

execute the benchmark applications while changing the settings of the preprocessor engines;

measure the performance of the device during the execution of the benchmark applications; and find the impact on performance based on the measured performance of the device.

17. The system according to claim 14, wherein:

a number of the preprocessor engines is equal to X;

a number of the settings is equal to Y;

a number of the defined groups is equal to Z; and the number of the preprocessor engine configurations is reduced from YX to YZ.

18. The system according to claim 14, wherein the processor is to:

compute statistical measures based on vectors for corresponding ones of the prefetchers engines describing the impact on the performance of the device of changing settings of the preprocessor engines applied to benchmark applications being executed by the device; and define the groups based on the computed statistical measures.

19. The system according to claim 18, wherein the processor is to:

compute a measure of dispersion for each of the vectors; and compute measures of similarity between pairs of the vectors; and define the groups based on the computed measure of dispersion of at least some of the vectors and the computed measures of similarity between at least some of the pairs of vectors.

20. The system according to claim 19, wherein the measure of dispersion is a variance or a standard deviation.

21. The system according to claim 19, wherein each of the measures of similarity is a cosine similarity or correlation.

22. The system according to claim 19, wherein the processor is to select pivotal members of the groups such that a different one of the preprocessor engines is selected as a pivotal member of each of the groups based on the measure of dispersion of corresponding ones of the vectors.

23. The system according to claim 22, wherein the processor is to select the pivotal members based on highest measures of deviation of corresponding ones of the vectors.

24. The system according to claim 22, wherein the processor is to select the pivotal members based on the measure of dispersion of corresponding ones of the vectors while minimizing the measures of similarity between the corresponding ones of the vectors of the pivotal members.

25. The system according to claim 22, wherein the processor is to, for each one of the groups, add other ones of the preprocessor engines to the one group based on the measures of similarity of ones of the vectors with the vector of the pivotal member of the one group.

26. The system according to claim 22, wherein the processor is to, for each one of the groups, add at least one of the preprocessor engines to the one group based on at least one of the measures of similarity of at least one of the vectors with at least one of the vectors of at least one existing member of the one group.

27. A system, comprising:

preprocessor engines; and a processor to:

execute a software application;

execute a machine learning agent to select from different preprocessor engine configurations to control the preprocessor engines, the different preprocessor engine configurations being based on settings to control the preprocessor engines such that groups of the preprocessor engines are defined and for each one of the defined groups a respective setting is to be applied equally to the preprocessor engines of the one group; and control the preprocessor engines according to the different preprocessor engine configurations selected by the machine learning agent during execution of the software application.

28. The system according to claim 27, wherein the settings are aggressiveness levels, the preprocessor engine configurations are prefetcher engine configurations, and the preprocessor engines are prefetcher engines to:

predict next memory access addresses of a memory from which to load data to a cache during execution of the software application; and load the data from the predicted next memory access addresses to the cache during execution of the software application.

29. A method, comprising:

executing a software application;

executing a machine learning agent to select from different preprocessor engine configurations to control preprocessor engines, the different preprocessor engine configurations being based on settings to control the preprocessor engines such that groups of the preprocessor engines are defined and for each one of the defined groups a respective setting is to be applied equally to the preprocessor engines of the one group; and controlling the preprocessor engines according to the different preprocessor engine configurations selected by the machine learning agent during execution of the software application.

* * * * *